US007802236B2

(12) United States Patent  
Calder et al.

(10) Patent No.: US 7,802,236 B2  
(45) Date of Patent: Sep. 21, 2010

(54) METHOD AND APPARATUS FOR IDENTIFYING SIMILAR REGIONS OF A PROGRAM'S EXECUTION

(75) Inventors: Brad Calder, San Diego, CA (US); Timothy Sherwood, Santa Barbara, CA (US); Erez Perelman, Cupertino, CA (US); Gregory Hamerly, Poway, CA (US)

(73) Assignee: The Regents of the University of California, Oakland, CA (US)

( * ) Notice: Subject to any disclaimer, the term of this patent is extended or adjusted under 35 U.S.C. 154(b) by 686 days.

(21) Appl. No.: 10/659,066

(22) Filed: Sep. 9, 2003

(65) Prior Publication Data

US 2004/0111708 A1 Jun. 10, 2004

(51) Int. Cl.  
*G06F 9/44* (2006.01)

(52) U.S. Cl. .................................................. 717/130

(58) Field of Classification Search ................ 717/130, 717/131, 134, 135; 714/37–39, 41, 32, 819  
See application file for complete search history.

(56) References Cited

U.S. PATENT DOCUMENTS

| | | | | |
|---|---|---|---|---|
| 4,571,697 A | * | 2/1986 | Watanabe | 704/238 |
| 4,905,162 A | * | 2/1990 | Hartzband et al. | 706/52 |
| 5,263,120 A | * | 11/1993 | Bickel | 706/62 |
| 5,317,741 A | * | 5/1994 | Schwanke | 717/120 |
| 5,428,788 A | * | 6/1995 | Schwanke | 717/120 |
| 5,438,676 A | * | 8/1995 | Schwanke | 717/120 |
| 5,440,742 A | * | 8/1995 | Schwanke | 717/120 |
| 5,485,621 A | * | 1/1996 | Schwanke | 717/121 |
| 5,574,837 A | * | 11/1996 | Clark et al. | 345/440 |
| 5,699,507 A | * | 12/1997 | Goodnow et al. | 714/38 |
| 5,752,038 A | * | 5/1998 | Blake et al. | 717/158 |
| 5,832,182 A | * | 11/1998 | Zhang et al. | 706/50 |
| 5,912,989 A | * | 6/1999 | Watanabe | 382/228 |
| 5,953,006 A | * | 9/1999 | Baker et al. | 715/700 |
| 5,974,254 A | * | 10/1999 | Hsu | 717/109 |
| 6,138,270 A | * | 10/2000 | Hsu | 717/125 |
| 6,226,789 B1 | * | 5/2001 | Tye et al. | 717/138 |
| 6,421,668 B1 | * | 7/2002 | Yakhini et al. | 707/6 |
| 6,526,405 B1 | * | 2/2003 | Mannila et al. | 707/6 |
| 6,629,097 B1 | * | 9/2003 | Keith | 707/5 |
| 6,792,399 B1 | * | 9/2004 | Phillips et al. | 705/36 R |

(Continued)

OTHER PUBLICATIONS

Mitchel, Brian S; Mancoridis, Spiros; "Comparing the Decompositions Produced by Software Clustering Algorithms using Similarity Measurements", IEEE 2001, retrieved Jul. 17, 2006.*

(Continued)

*Primary Examiner*—Philip Wang  
(74) *Attorney, Agent, or Firm*—Greer, Burns & Crain Ltd.

(57) ABSTRACT

A method and architecture for analyzing a computer program by finding similar sections of execution of the computer program. Code of the computer program is run over a plurality of intervals of execution, and during the execution of the program, a statistic is tracked for a component. Using the tracked statistic, behavior of the computer program is identified over each of the plurality of intervals of execution, and at least one identified behavior of at least one interval of execution is compared to the behavior of another interval of execution to find similar sections of behavior.

53 Claims, 28 Drawing Sheets

U.S. PATENT DOCUMENTS

| | | | | |
|---|---|---|---|---|
| 6,802,046 | B2* | 10/2004 | Coelho et al. | 716/4 |
| 7,065,544 | B2* | 6/2006 | Moreno | 708/422 |
| 7,158,961 | B1* | 1/2007 | Charikar | 707/2 |
| 2002/0107858 | A1* | 8/2002 | Lundahl et al. | 707/100 |
| 2003/0149968 | A1* | 8/2003 | Imai | 717/156 |
| 2003/0189904 | A1* | 10/2003 | Li | 370/252 |
| 2005/0120333 | A1* | 6/2005 | Inoue et al. | 717/120 |

OTHER PUBLICATIONS

Sato-Ilic, Mika; "On Evaluation of Clustering using Homogeneity Analysis", p. 3588-3593, IEEE 2000, retrieved Jul. 17, 2006.*

Schwanke, Robert W; "An Intelligent Tool for Re-engineering Software Modularity", p. 83-92, 1991 IEEE, retrieved Jul. 17, 2006.*

Wang, Haixun; Wang, Wei; Yang, Jiong; Yu, Philip S; "Clustering by Pattern Similarity in Large Data Sets", p. 394-405, ACM 2002, retrieved Jul. 17, 2006.*

"What is Simulation?" retrieved from URL <http://www.cis.ufl.edu/~fishwick/introsim/node1.html on Jan. 11, 2007, used to cite the definition of 'simulation.'*

Merriam-Webster's Collegiate Dictionary Tenth Edition, p. 59 (2001), definition of arbitrary.*

Gitchell, David; Tran, Nicholas, "SIM: A Utility for Detecting Similarity in Computer Programs", 1999 ACM, p. 266-270, retrieved from ACM Sep. 12, 2007.*

Podgurski, Andy; Yang, Charles; "Partition Testing, Stratified Sampling, and Cluster Analysis", 1993 ACM, p. 169-181, retrieved from ACM Sep. 12, 2007.*

Aragon, J.L., Gonzales, J., Gonzales, A., "Power-Aware Control Speculation Through Selective Throttling," Proceedings of the 9$^{th}$ International Symposium on High-Performance Computer Architecture, Feb. 2003.

Balasubramonian, R., Albonesi, D.H., Buyuktosunoglu, A., Dwarkadas, S., "Memory Hierarchy Reconfiguration for Energy and Performance in General-Purpose Processor Architectures," 22$^{nd}$ International Symposium on Microarchitecture, pp. 245-257, 2000.

Barnes, R.D., Nystrom, E.M., Merten, M.C., Hwu, W.W., "Vacuum Packing: Extracting Hardware-Detected Program Phases for Post-Link Optimization," 35$^{th}$ International Symposium on Microarchitecture, Dec. 2002.

Brooks, D., Martonosi, M., "Dynamic Thermal Management for High-Performance Microprocessors," In International Symposium on High-Performance Computer Architecture (HPCA-7), Jan. 2001.

Buyuktosunoglu, A., Karkhanis, T., Albonesi, D.H., Bose, P., "Energy Efficient Co-Adaptive Instruction Fetch and Issue," 30$^{th}$ Annual International Symposium on Computer Architecture, Jun. 2003.

Dhodapkar, A., Smith, J.E., "Comparing Program Phase Detection Techniques," Proc. of the Int. Symposium on Microarchitecture, 2003.

Dhodapkar, A.S., Smith, J.E., "Managing Multi-Configuration Hardware via Dynamic Working Set Analysis," 29$^{th}$ International Symposium on Computer Architecture (ISCA 2002), Alaska, May 2002.

Dropsho, S., Buyuktosunoglu, A., Balasubramoniam, R., Albonesi, D.H., Dwarkadas, S., Semerar, G., Magklis, G., Scott, M.L., Integrating Adaptive On-Chip Storage Structures for Reduced Dynamic Power, International Conference on Parallel Architectures and Compilation Techniques, Sep. 2002.

http://charlotte.ucsd.edu/~calder/simpoint/, retrieved from the Internet Jun. 3, 2005, pp. 1-2, 'SimPoint'.

Huang, M., Renau, J., Torrelas, J., "Positional Adaptation of Processors: Application to Energy Reduction," In 30$^{th}$ Annual International Symposium on Computer Architecture, Jun. 2003.

Lafage, T., Seznec, A., "Choosing Representative Slices of Program Execution for Microarchitecture Simulations: A Preliminary Application to the Data Stream," In Workload Characterization of Emerging Applications, Kluwer Academic Publishers, Sep. 2000, pp. 149-163.

Merten, M.C., Trick, A.R., George, C.N., Gyllenhaal, J.C., Hwu, W.W., "A Hardware-Driven Profiling Scheme for Identifying Hot Spots to Support Runtime Optimization," 26$^{th}$ International Symposium on Computer Architecture, pp. 136-147, May 1999.

Sherwood, T., Calder, T., "Time Varying Behavior of Programs," UCSD Technical Report, CS99-630, Aug. 1999, pp. 1-16. http://www-cse.ucsd.edu/~calder/papers/UCSD-CS99-630.pdf.

Sherwood, T., Perelman, E., Calder, B., "Basic Block Distribution Analysis to Find Periodic Behavior and Simulation Points in Applications," Proceedings of the International Conference on Parallel Architectures and Compilation Techniques (PACT 2001), Sep. 2001, Barcelona, Spain. http://www-cse.ucsd.edu/-calder/papers/PACT-01-BBDA.pdf.

Sherwood, T., Perelman, E., Hamerly, G., Calder, B., "Automatically Characteriziing Large Scale Program Behavior," Proceedings of the 10$^{th}$ International Conference on Architectural Support for Programming Languages and Operating Systems (ASPLOS 2002), Oct. 2002, San Jose, California. http://www-cse.ucsd.edu/-calder/papers/ASLOS-02-SimPoint.pdf Wunderlich, R., Wenisch, T., Falsafi, B., Hoe, J., "Smarts: Accelerating Microarchitecture Simulation Via Rigorous Statistical Sampling," In 30$^{th}$ Annual International Symposium on Computer Architecture, Jun. 2003.

Zhang, C., Vahid, F., Najjar, W., "A Highly-Configurable Cache Architecture for Embedded Systems," 30$^{th}$ Annual International Symposium on Computer Architecture, Jun. 2003.

Hind, Michael J., Rajan, Vadakkedathu T., Sweeney, Peter F., "Phase Shift Detection: A Problem Classification," IBM Research Report, IBM T.J. Watson Research Center, Hawthorne, NY, Aug. 4, 2003.

Lau, Jeremy, Schoenmackers, Stefan, Calder, Brad, "Transition Phase Classification and Prediction," 11$^{th}$ Int. Symposium on High Performance Computer Architecture, Feb. 2005.

Smith, James, E., Dhodapkar, Ashutosh, S., "Dynamic Microarchitecture Adaptation Via Co-Designed Virtual Machines," ISSCC 2002.

Duesterwald, Evelyn, Cascaval, Calin, Dwarkadas, Sandhya, "Characterizing and Predicting Program Behavior and its Variability," Proc. of the 12$^{th}$ Int. Conference on Parallel Architectures and Compilation Techniques, 2003.

* cited by examiner

| | |
|---|---|
| Instruction Cache | 32k 2-way set-associative, 32 byte blocks, 1 cycle latency |
| Data Cache | 64k 4-way set-associative, 32 byte blocks, 2 cycle latency |
| Unified L2 Cache | 1 Meg 4-way set-associative, 32 byte blocks, 12 cycle latency |
| Branch Predictor | hybrid – 8-bit gshare w/ 8K 2-bit predictors + a 8k bimodal predictor |
| Out-of-Order Issue | out-of-order issue of up to 8 operations per cycle, 128 entry re-order buffer |
| Mechanism | load/store queue, loads may execute when all prior store addresses are known |
| Architecture Registers | 32 integer, 32 floating point |
| Functional Units | 8-integer ALU, 4-load/store units, 2-FP adders, 2-integer MULT/DIV, 2-FP MULT/DIV |
| Virtual Memory | 8K byte pages, 30 cycle fixed TLB miss latency after earlier-issued instructions complete |

FIG. 8

| name | init | period | bpred | ruu | IPC | d miss | i miss | val miss | addr miss |
|---|---|---|---|---|---|---|---|---|---|
| bzip | 2 | 9 | 4.2% | 75.8% | 2.681 | 1.7% | 0.000% | 25.1% | 13.3% |
| hydro | 5 | 17 | 0.4% | 68.7% | 0.793 | 14.6% | 0.022% | 8.3% | 0.6% |
| tomcat | 13 | 5 | 0.8% | 59.6% | 0.955 | 9.7% | 0.043% | 46.2% | 1.0% |
| vortex | 40 | 144 | 0.6% | 43.4% | 2.726 | 0.9% | 0.979% | 15.2% | 16.4% |
| vpr | 4 | 2 | 9.3% | 49.8% | 1.143 | 3.0% | 0.001% | 16.6% | 14.2% |
| wave | 68 | 70 | 0.6% | 62.2% | 2.596 | 7.4% | 0.000% | 38.1% | 7.9% |

FIG. 10

| name | start | bpred | err | run | err | IPC | err | data | err | inst | err | val | err | addr | err |
|---|---|---|---|---|---|---|---|---|---|---|---|---|---|---|---|
| bzip | 150 | 4.2% | 1% | 75.4% | 0.5% | 2.8 | 5.1% | 1.3% | 25.8% | 0.0% | - | 25.4% | 1.1% | 15.7% | 17.9% |
| hydro | 6 | 0.3% | 16% | 69.8% | 1.7% | 0.8 | 2.5% | 14.8% | 1.5% | 0.0% | - | 8.2% | 1.8% | 0.6% | 9.1% |
| tomcat | 12 | 0.8% | 3% | 60.5% | 1.5% | 0.9 | 1.5% | 9.8% | 1.1% | 0.0% | - | 41.1% | 12.4% | 0.9% | 17.1% |
| vortex | 382 | 0.6% | 2% | 43.7% | 0.8% | 2.8 | 1.9% | 0.9% | 1.2% | 1.0% | 2.8% | 15.2% | 0.1% | 16.3% | 0.7% |
| vpr | 746 | 9.0% | 3% | 40.7% | 0.3% | 1.2 | 4.3% | 3.1% | 6.4% | 0.0% | - | 16.6% | 0.0% | 14.4% | 1.3% |
| wave | 127 | 0.6% | 9% | 60.7% | 2.5% | 2.5 | 3.3% | 7.7% | 4.4% | 0.0% | - | 40.4% | 6.1% | 8.5% | 7.8% |

FIG. 11

| name | start | bpred | err | run | err | IPC | err | data | err | inst | err | val | err | addr | err |
|---|---|---|---|---|---|---|---|---|---|---|---|---|---|---|---|
| bzip | 1733 | 4.0% | 6% | 63.8% | 18.8% | 2.5 | 5.9% | 1.8% | 8.0% | 0.0% | - | 14.2% | 77.2% | 7.3% | 82.0% |
| hydro | 36 | 0.3% | 12% | 69.2% | 0.9% | 0.8 | 3.9% | 14.8% | 1.4% | 0.0% | - | 8.4% | 0.4% | 0.6% | 9.3% |
| tomcat | 144 | 0.8% | 1% | 60.9% | 2.2% | 1.0 | 1.9% | 9.5% | 2.0% | 0.1% | - | 39.8% | 16.2% | 1.1% | 13.7% |
| vortex | 330 | 0.6% | 3% | 41.9% | 3.6% | 2.8 | 3.4% | 0.7% | 16.3% | 1.0% | 4.0% | 15.7% | 3.8% | 17.7% | 7.7% |
| vpr | 746 | 9.0% | 3% | 49.7% | 0.3% | 1.2 | 4.3% | 3.1% | 0.4% | 0.0% | - | 16.6% | 0.0% | 14.4% | 1.3% |
| wave | 1036 | 0.3% | 84% | 61.5% | 1.2% | 2.8 | 6.0% | 7.9% | 8.7% | 0.0% | - | 37.0% | 2.8% | 6.5% | 20.8% |

FIG. 12

| name | start | bpred | err | ruu | err | IPC | err | data | err | inst | err | val | err | addr | err |
|---|---|---|---|---|---|---|---|---|---|---|---|---|---|---|---|
| bzip | 11 | 4.9% | 17% | 74.3% | 2.0% | 2.2 | 23.2% | 2.8% | 68.9% | 0.0% | - | 22.7% | 10.8% | 8.5% | 55.4% |
| hydro | 22 | 0.3% | 12% | 69.6% | 1.4% | 0.8 | 2.4% | 14.8% | 1.7% | 0.0% | - | 8.5% | 1.8% | 0.6% | 8.6% |
| tomcat | 18 | 0.6% | 28% | 61.0% | 2.4% | 0.9 | 4.6% | 10.1% | 5.1% | 0.0% | - | 44.0% | 6.1% | 0.3% | 23.7% |
| vortex | 184 | 0.4% | 42% | 46.4% | 6.9% | 3.2 | 17.6% | 0.9% | 6.1% | 0.7% | 36% | 14.8% | 2.3% | 16.2% | 1.6% |
| vpr | 6 | 1.1% | 74.0% | 58.1% | 16.6% | 3.0 | 16.2% | 0.4% | 62.1% | 0.0% | - | 16.6% | 0.2% | 13.8% | 2.6% |
| wave | 138 | 0.9% | 55% | 60.5% | 2.8% | 2.4 | 9.1% | 7.3% | 1.1% | 0.0% | - | 40.1% | 5.5% | 7.7% | 2.3% |

FIG. 13

| | |
|---|---|
| Instruction Cache | 8k 2-way set-associative, 32 byte blocks, 1 cycle latency |
| Data Cache | 16k 4-way set-associative, 32 byte blocks, 2 cycle latency |
| Unified L2 Cache | 1 Meg 4-way set-associative, 32 byte blocks, 20 cycle latency |
| Memory | 150 cycle round trip access |
| Branch Predictor | hybrid – 8-bit gshare w/ 8k 2-bit predictors + a 8k bimodal predictor |
| Out-of-Order Issue | out-of-order issue of up to 8 operations per cycle, 128 entry re-order buffer |
| Mechanism | load/store queue, loads may execute when all prior store addresses are known |
| Architecture Registers | 32 integer, 32 floating point |
| Functional Units | 8-integer ALU, 4-load/store units, 2-FP adders, 2-integer MULT/DIV, 2-FP MULT/DIV |
| Virtual Memory | 8K byte pages, 30 cycle fixed TLB miss latency after earlier-issued instructions complete |

FIG. 14

| name | Len | Init | SP | PC | Proc Name | Multiple SimPoints | | | | |
|---|---|---|---|---|---|---|---|---|---|---|
| ammp | 3265 | 23 | 109 | 026834 | mm_fv_update. | 3026(13.8) 1607(12.6) | 1774(31) 2437(4.9) | 595(15.3) 3112(11.5) | 1068(1.3) 2480(2.2) | 2128(7.4) |
| applu | 2238 | 3 | 2180 | 018520 | buts_ | 624(22.1) 1507(14.5) | 1625(22.5) | 1956(18.8) | 2234(6.6) | 1380(15.5) |
| apsi | 3479 | 3 | 3409 | 0380ac | dctdxf_ | 2107(5.6) | 2863(14) | 1007(70.7) | 896(7.7) | 1618(2) |
| art-110 | 417 | 75 | 341 | 00fbb0 | match | 82(42.9) | 255(41.2) | 50(15.8) | | |
| art-470 | 450 | 83 | 366 | 00f5d0 | match | 300(36.2) | 46(14.7) | 236(49.1) | | |
| bzip2-graphic | 1435 | 4 | 719 | 012a5c | spec_putc | 168(11.7) 519(11.6) | 1042(3.7) 872(8.2) | 430(7.5) 195(5.6) | 762(16.2) 148(2) | 106(15.3) 1435(18.2) |
| bzip2-program | 1249 | 4 | 459 | 00cdd0 | sortIt | 140(11) 1005(7) | 468(12.3) 94(6.9) | 78(6.2) 606(14) | 990(10) 859(14.6) | 445(7.4) 341(4.7) |
| bzip2-source | 1088 | 4 | 978 | 00d774 | qSort3 | 395(16) 177(34.7) | 511(4.3) | 64(29.1) | 488(7.3) | 530(8.6) |
| crafty | 1918 | 462 | 775 | 021730 | SwapXray | 123(25) | 510(19.7) | 664(22.7) | 1123(32.5) | |
| eon-rushmeier | 578 | 140 | 404 | 04e1b4 | viewingHit | 260(6.6) | 238(23.7) | 337(20.9) | 435(35.6) | 216(13.1) |
| equake | 1315 | 35 | 813 | 012410 | phi0 | 874(12.2) 62(11.6) | 1292(36.7) | 463(12.2) | 336(24.1) | 3(3.2) |
| facerec | 2682 | 356 | 376 | 02d1f4 | graphroutines_lo. | 1976(60.1) | 1528(2.5) | 1935(3.9) | 1398(29.2) | 348(4.3) |
| fma3d | 2683 | 192 | 2542 | 0e3140 | scatter_element. | 112(7) 509(13) | 209(0.6) | 842(68.4) | 1600(11) | 47(0.1) |
| galgel | 4093 | 3 | 2492 | 02db00 | syshtn_ | 3511(5.5) 2181(29) | 2081(11) 2161(3.3) | 3466(11.2) 1017(5.5) | 516(31.6) | 2141(2.7) |
| gap | 2695 | 639 | 675 | 050750 | CollectGarb | 1114(8.2) | 1196(58.1) | 85(12.7) | 2189(14) | 2609(7.1) |
| gcc-166 | 469 | 61 | 390 | 0d157e | gen_rtx | 238(6.4) | 149(42.2) | 30(21.3) | 404(30.1) | |
| gcc-200 | 1086 | 151 | 737 | 0ceb04 | refers_to_regno. | 8(45.8) | 587(17.9) | 921(10.9) | 575(14.5) | 1011(11) |
| gcc-expr | 120 | 27 | 37 | 191fd0 | validate_change | 63(12.5) 88(5) | 81(15.8) | 42(16.7) | 25(4.2) | 9(45.8) |
| gcc-integrate | 131 | 14 | 5 | 1198e0 | find_single_use. | 118(9.2) 73(17.6) | 41(27.5) | 102(21.4) | 9(20.6) | 57(3.8) |
| gcc-scilab | 620 | 139 | 208 | 100d54 | insert | 255(54.2) | 39(9.5) | 231(13.2) | 379(15.8) | 170(7.3) |
| gzip-graphic | 1037 | 158 | 654 | 009c00 | fill_window | 961(45.4) 566(13.4) | 87(28.5) | 373(7.3) | 1(0.1) | 461(5.2) |
| gzip-log | 395 | 91 | 266 | 00d280 | inflate_codes | 207(24.1) | 171(16.5) | 157(16.7) | 330(23.5) | 71(19.2) |
| gzip-program | 1688 | 112 | 1190 | 009660 | longest_match | 228(22.7) | 779(21.4) | 472(9.1) | 1410(20.4) | 594(26.4) |
| gzip-random | 821 | 152 | 624 | 00a14c | deflate | 484(0.9) 1(0.1) | 625(0.2) | 580(51) | 811(16.8) | 200(30.9) |
| gzip-source | 843 | 68 | 335 | 00a224 | deflate | 248(14.5) 720(2.5) | 327(13.2) | 167(17.7) | 656(27.8) | 373(24.4) |
| lucas | 1423 | 11 | 546 | 021ef0 | fft_square_ | 982(21.4) | 602(10.7) | 1370(21.4) | 458(28) | 524(18.6) |
| mcf | 618 | 15 | 554 | 00911c | price_out_impl_k | 268(39.6) 143(3.9) | 425(11) | 205(30.1) | 468(4.5) | 316(10.8) |
| mesa | 2816 | 6 | 1136 | 0a3060 | general_textured. | 1846(35.3) | 2606(0.7) | 398(35.3) | 977(28.8) | |
| mgrid | 4191 | 21 | 3293 | 016060 | resid_ | 43(24.2) | 3459(22.8) | 807(20.1) | 3110(16.3) | 2476(16.6) |
| parser | 5467 | 388 | 1147 | 0ledfc | region_valid | 3342(25.1) | 1771(29.8) | 5102(19.7) | 2008(19.4) | 4772(6) |
| perlbmk-diff | 399 | 56 | 142 | 07f074 | regmatch | 6(1) 239(31.8) | 355(62.7) | 11(0.5) | 397(0.8) | 12(3.3) |
| perlbmk-make | 20 | 3 | 12 | 08268c | Perl_runops_st. | 1(5) | 20(20) | 6(75) | | |
| perlbmk-perf | 290 | 69 | 6 | 08268c | Perl_runops_st. | 39(59.3) | 207(40.7) | | | |
| perlbmk-split | 1108 | 162 | 451 | 07fc98 | regmatch | 704(44.9) | 596(9.1) | 232(21.7) | 461(21.8) | 501(2.6) |
| sixtrack | 4709 | 250 | 3044 | 167894 | thin6d_ | 6(1.7) | 1719(98.3) | | | |
| swim | 2258 | 3 | 2080 | 019130 | calc1_ | 1951(29.8) | 38(14) | 777(24.7) | 710(13.8) | 2101(17.8) |
| twolf | 3464 | 7 | 1067 | 041094 | ucxx1 | 312(17) | 2888(11.3) | 3268(11.7) | 961(20.4) | 2054(39.5) |
| vortex-one | 1189 | 36 | 272 | 06289c | Mem_GetWord | 536(17.1) | 366(23.3) | 115(8.2) | 1068(17.2) | 878(34.2) |
| vortex-three | 1330 | 177 | 565 | 0336a8 | Part_Delete | 934(25.4) 485(25.4) | 1129(11.4) | 96(8.9) | 47(11.1) | 586(17.8) |
| vortex-two | 1386 | 206 | 1025 | 05e6fc | Mem_NewRegion | 635(7.6) 397(23.2) | 752(24.5) | 554(21.9) | 930(7.4) | 380(15.3) |
| vpr-place | 1122 | 4 | 593 | 0224ec | get_non_update. | 166(25.5) 547(27.9) | 857(21.6) | 1(0.2) | 362(12.5) | 1057(12) |
| vpr-route | 840 | 12 | 477 | 025c80 | get_heap_head | 559(29.9) | 89(28) | 353(23.8) | 3(2.6) | 490(15.7) |
| wupwise | 3496 | 11 | 3238 | 01d680 | zgemm_ | 1811(43.3) | 91(8) | 3055(43.2) | 1524(5.4) | |

FIG. 24

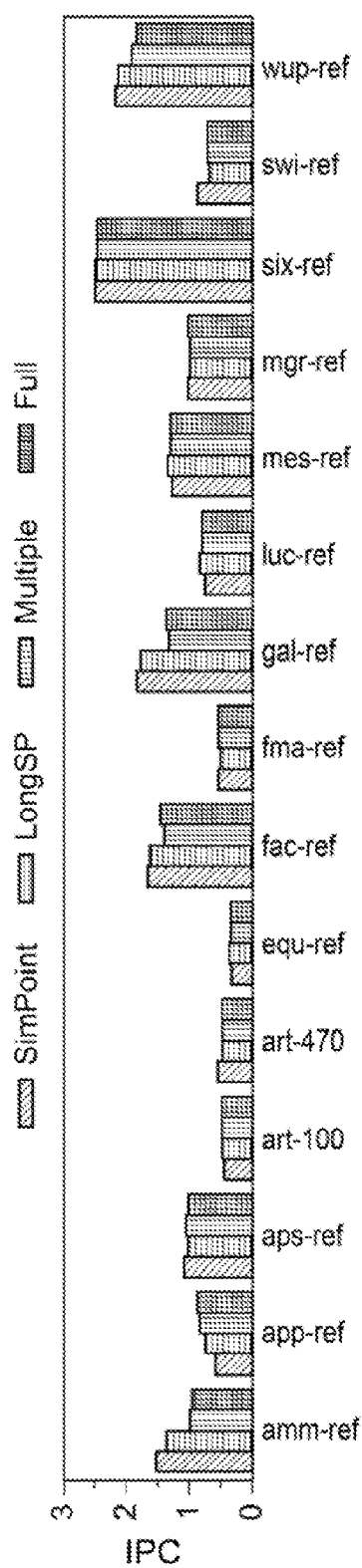
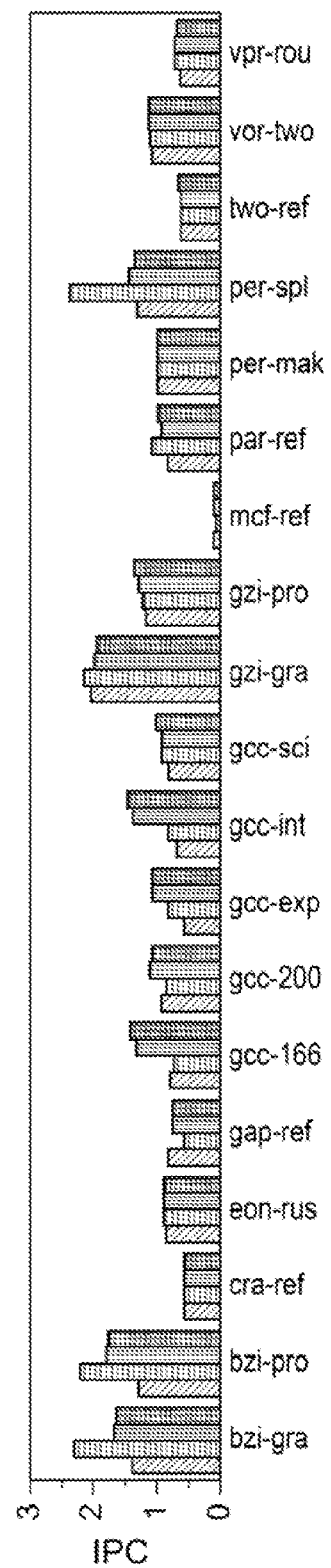
FIG. 25A
FIG. 25B

| phase | IPC | (stddev) | bpred | (stddev) | dl1 | (stddev) | il1 | (stddev) | energy | (stddev) | ul2 | (stddev) |
|---|---|---|---|---|---|---|---|---|---|---|---|---|
| full | 1.32 | (43.4%) | 27741 | (135.5%) | 445083 | (110.7%) | 50763 | (203.2%) | 6.44E+08 | (90.0%) | 227912 | (139.7%) |
| 18.5% | 0.61 | (1.6%) | 34665 | (22.0%) | 753382 | (5.4%) | 125091 | (23.2%) | 1.03E+09 | (1.8%) | 395997 | (5.3%) |
| 18.1% | 1.95 | (0.3%) | 13048 | (3.9%) | 28112 | (15.1%) | 43 | (73.9%) | 3.22E+08 | (0.2%) | 1006 | (5.6%) |
| 7.2% | 0.64 | (0.2%) | 843 | (15.1%) | 885081 | (0.1%) | 75 | (215.5%) | 9.78E+08 | (0.3%) | 443655 | (0.1%) |
| 4.0% | 1.49 | (1.2%) | 10145 | (7.6%) | 703554 | (6.8%) | 15591 | (5.2%) | 4.20E+08 | (1.1%) | 354084 | (7.0%) |
| 3.9% | 1.76 | (1.6%) | 2015 | (13.6%) | 98947 | (5.9%) | 102 | (45.1%) | 3.57E+08 | (1.6%) | 15595 | (12.6%) |
| gcc | | | | | | | | | | | | |
| phase | IPC | (stddev) | bpred | (stddev) | dl1 | (stddev) | il1 | (stddev) | energy | (stddev) | ul2 | (stddev) |
| full | 1.33 | (16.3%) | 56045 | (11.1%) | 90446 | (58.2%) | 60 | (138.1%) | 4.82E+08 | (13.5%) | 22880 | (112.0%) |
| 17.1% | 1.24 | (3.4%) | 53300 | (10.8%) | 96960 | (10.1%) | 12 | (44.2%) | 5.05E+08 | (3.5%) | 24218 | (8.6%) |
| 9.4% | 1.23 | (3.8%) | 54973 | (11.5%) | 90523 | (11.3%) | 11 | (45.5%) | 5.09E+08 | (3.8%) | 24518 | (9.3%) |
| 8.8% | 1.76 | (0.6%) | 56449 | (4.8%) | 37331 | (5.6%) | 241 | (8.4%) | 3.55E+08 | (0.6%) | 5617 | (15.6%) |
| 8.0% | 1.22 | (4.3%) | 54791 | (6.8%) | 99671 | (11.9%) | 40 | (25.7%) | 5.14E+08 | (4.4%) | 28153 | (11.0%) |
| 7.4% | 1.24 | (3.1%) | 55215 | (11.1%) | 96701 | (9.6%) | 12 | (35.4%) | 5.04E+08 | (3.2%) | 23701 | (8.4%) |
| gzip | | | | | | | | | | | | |

FIG. 33

METHOD AND APPARATUS FOR IDENTIFYING SIMILAR REGIONS OF A PROGRAM'S EXECUTION

STATEMENT OF GOVERNMENT INTEREST

This invention was made with government support under Grant No. DABT63-98-C-0045 awarded by the Defense Advanced Research Projects Agency (DARPA). The government has certain rights in the invention.

FIELD OF THE INVENTION

The present invention relates generally to the field of computers. The invention additionally relates generally to the field of analysis of computing systems.

BACKGROUND OF THE INVENTION

Understanding program behavior is at the foundation of computer architecture and program optimization. Many programs have wildly different behavior on even the very largest of scales (such as over the complete execution of the program). This realization has ramifications for many architectural and compiler techniques, from thread scheduling, to feedback directed optimizations, to the way programs are simulated. However, in order to take advantage of time-varying behavior, analytical tools are needed to analyze program behavior over sections of execution.

For example, in architecture research, it is frequently necessary to take one instance of a program with a given input, and analyze its performance over many different architecture configurations. In a nonlimiting example, a single binary with one input set may be run hundreds or thousands of times to examine how the effectiveness of a given architecture changes with its size. Where the program is simulated can have a great impact on the accuracy of the results.

SUMMARY OF THE INVENTION

The present invention provides a method and architecture for analyzing a computer program by finding similar sections of execution of the computer program. To analyze the computer program, code of the computer program is executed over a plurality of intervals of execution, and during the execution of the program, a statistic is tracked for a component. Using the tracked statistic, behavior of the computer program is identified over each of the plurality of intervals of execution, and at least one identified behavior of at least one interval of execution is compared to identified behavior of another interval of execution to find intervals that are similar to each other.

BRIEF DESCRIPTION OF THE DRAWINGS

FIG. 8 is a table showing a baseline simulation model used in an example of simulating an executed program;

FIG. 10 is a table showing baseline behavior of programs bzip, hydro, tomcat, vortex, vpr, and wave;

FIG. 11 is a table showing results for simulating one complete period through programs bzip, hydro, tomcat, vortex, vpr, and wave, respectively, according to an embodiment of the present invention;

FIG. 12 is a table showing results for simulating programs bzip, hydro, tomcat, vortex, vpr, and wave, respectively, at an automatically chosen 300 million instruction analysis point;

FIG. 13 is a table showing results for simulating programs bzip, hydro, tomcat, vortex, vpr, and wave, respectively, at a section of 300 million simulated instructions chosen one period after the end of the initialization phase, according to an embodiment of the present invention;

FIG. 14 is a table showing another baseline simulation model for simulating a program according to another aspect of the present invention;

FIG. 24 is a table showing single analysis points for SPEC2000 benchmarks, as determined in an example of the present method;

FIGS. 25A-25B show multiple analysis point results for SPEC2000 programs according to an embodiment of the present invention;

FIG. 33 is a table showing per-phase homogeneity compared to programs as a whole, according to an embodiment of the present method;

DETAILED DESCRIPTION OF THE INVENTION

Figure 1:
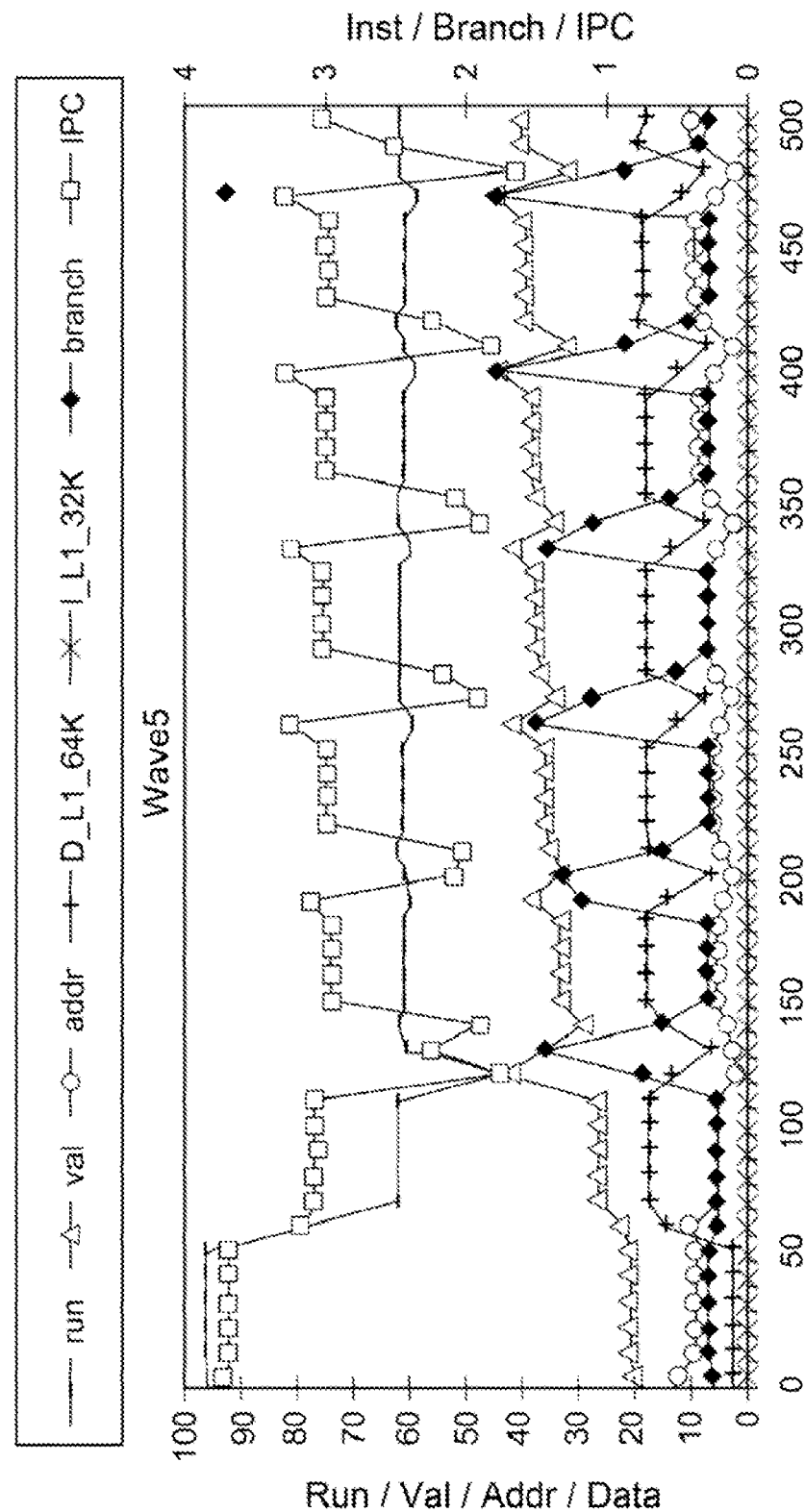
FIG. 1 is a chart showing time-varying behavior for execution of the SPEC95 program wave.

Modern computing systems are very complex, as indicated by their behavior. Analysis of complex systems is therefore performed using samples, since it is usually difficult if not impossible to perform analysis of complete execution of a program or workload. Samples are taken over particular intervals of execution that may range from one instruction to complete execution, or over various lengths of time. A problem, then, becomes locating appropriate points to sample the system for analysis. Conventionally, a statistical sampling method has been used for this purpose. However, this method may not be reliable or efficient, particularly with more complex systems.

The present method, by contrast, locates places for analysis by identifying similar regions of a program's execution. For example, many programs execute as a series of different phases, over which the program's behavior is relatively stable. For example, each phase may be very different from the others, yet it still has a fairly homogeneous behavior within the phase. These phases can reoccur in the program, where the behavior of the program is similar in two or more related, but not necessarily contiguous, phases. According to an aspect of the present invention, one can identify different phases in a program's execution.

Phase analysis can be used to pick a handful of samples representative of the full program. The phase analysis can be used to reduce simulation time significantly, to provide an accurate characterization of the full program, and to perform the analysis to accomplish the first two goals quickly, for example in a matter of minutes.

For hardware optimization, one significant potential benefit of exploiting phase behavior is to optimize the usage of architecture components to phase behavior for power optimization. Optimizations have been proposed including cache re-configuration, processor width adaptation, multi-core execution, and more. Examples of these are briefly summarized. Most of these optimizations try to save energy, while maintaining performance.

In a modern processor, a significant amount of energy is consumed by hardware structures, but this energy may not be put to good use if an application is not fully utilizing them. For example, a program might not be accessing a large amount of data or might not be accessing it with high locality for a cache structure.

I-cache usage, for example, may show either a low number of misses or a high number for different intervals of execution. During phases with high usage, it may be better to use a larger cache, and then to shut down the sets or ways for the phases that do not need the additional storage. This can save energy while potentially maintaining performance. To address this inefficiency, phase information can be used for dynamically reconfiguring caches and other structures with the intention of saving energy.

Another form of re-configurable cache that has been proposed dynamically divides the data cache into multiple partitions, each of which can be used for a different function, such as instruction reuse buffers or value predictors. These techniques can be triggered at different points in program execution including procedure boundaries and fixed intervals. The overhead of re-configuration can be quite large, so it can be important to make these policy decisions only when the large scale program behavior changes. Phase classification can be used to track this behavior to minimize overhead while guaranteeing adequate sensitivity to attain maximum benefit.

One way to reduce the energy consumption in a processor is to reduce the number of instructions entering the pipeline every cycle. Reducing the width of the processor reduces the demand on the fetch, decode, number and type of functional units used, and issue logic. Certain phases can have a high degree of instruction level parallelism, whereas other phases have a very low degree. These techniques can potentially save a lot of energy without hurting performance by throttling back the width of the processor for phases that have low IPC, while still using aggressive widths for phases with high IPC.

Architectures have been proposed that have a single ISA architecture that has several heterogeneous cores underneath it. As the program executes, the resource requirements are determined on a per phase basis. These resource requirements determine which of the multi-core architectures a given phase should run on. The phase classification then guides each phase of the programs execution to a specific core. So, for example, as the program executes it may execute one phase on a VLIW core then switch to a SuperScalar OOO core for another phase, then potentially to an SMT core for a different phase, etc.

Phase information can potentially also be used to guide adaptive compiler optimizations. An exemplary optimization is the creation of optimized code "packages" that are targeted towards a given phase, in order to specialize the program's behavior to that phase of execution. This can result in faster execution, lower power, or many other run-time benefits.

Phase analysis could also be used to exploit value locality found in programs through value specialization. Value specialization can create specialized versions of procedures or code-regions based upon the values frequently seen. These techniques are built on the idea of finding the most frequent values for loads over the whole program, and then specializing the program to those frequent values. If different phases find different values, then phase analysis can be used to guide tracking of frequent values and value specialization more efficiently.

It is also is important in many cases for analysis to be performed efficiently. For example, modern architecture research relies heavily on detailed pipeline simulation. However, simulating the full execution of an industry standard benchmark can take weeks or months to complete. To overcome this problem, researchers typically choose a very small portion of a program's execution to evaluate their results, rather than simulating the entire program.

A preferred system and method according to the present invention finds similar sections of software execution regardless of temporal adjacency. To analyze a computer program (including a complete program and/or a subset of a program), code of the program is run, which may include actual code execution, simulation, or emulation, over a plurality of intervals of execution. An interval as used herein is a selection of continuous instructions in program execution order. For example, an interval may be thought of as a slice of time, though an interval may be, for example, a time interval, an instruction interval, and/or a metric-based interval. Particular intervals of execution may, but need not, overlap one another, an interval of execution may include the full executed code, and the intervals being compared may be of different lengths.

During running of the code, a statistic is tracked for a component. In this way, the statistic is correlated with the component over the interval of execution. A component may include, for example, a program component, such as, but not limited to, an identifiable section of control flow of the computer program. This identifiable section may include items such as, but not limited to, an instruction, a basic block of the code, a procedure, a loop, a load instruction, and a branch instruction. The component may also be, for example, a memory region.

A statistic tracked for one or more of these components includes a hardware metric and/or a hardware-independent metric. Exemplary statistics include frequency, number of instructions executed, number of memory accesses, IPC, performance counters, and cache miss rates. For example, a frequency of a basic block may be tracked over an interval of instructions. A plurality of statistics and/or components may be tracked.

Using the tracked statistic for the component, behaviors for the intervals of execution may be identified. The identified behavior for an interval provides a signature for that interval, which may be in various forms. These identified behaviors for particular intervals may be compared to one another to identify phases. A phase as used herein refers to a set of intervals that are similar to one another. The identified behavior may also be used to find periods, analysis points (a single one or several), and/or initialization phases, to optimize a program, or many other uses.

The behavior of a phase is a general term used to describe any of a variety of hardware metrics and/or hardware-independent metrics, which are either directly measurable or inferable, and can include (but are not limited to) the number of hardware events (for example, cache misses or branch mispredictions), performance counters, program counters, the code executed, memory used, basic blocks executed, branches executed, control flow constructs executed, or power consumption rate. The behavior may include, for example, the behavior of the hardware, operating system, runtime system, and/or the software itself while executing the software.

The problem then becomes how to find and identify similarity of behavior and phase-based behavior for a computer program in a preferably accurate and efficient manner. If a phase of execution is correctly identified, there should be only comparatively small amounts of variation between any two segments of that phase. The amount of variation can be adjusted as desired according to preferred embodiments of the invention.

For example, to identify phases, intervals of execution having similar behavior may be grouped into clusters, where each of the intervals in a particular cluster is more similar in program behavior to the other intervals in that cluster than to those in other clusters. By grouping intervals into the clusters, a phase classification for each interval can be determined, where each resulting cluster can be labeled as a phase.

One or more analysis points in each of the grouped clusters, indicating one or more representative intervals for that cluster, may be determined, and these points may be used to analyze the program. For example, analysis points may be used to simulate execution of the program. The point may be a point that is closest to an average behavior of the program, a point that is the earliest interval of execution within a predetermined distance from an average behavior of the cluster, or another selected point. By weighting the selected analysis points based on a size of the cluster, for example based on a number of instructions or a time within the cluster, the selected analysis points can collectively represent a complete execution of code (a subset of the program or a complete program).

The number of clusters and/or analysis points may be narrowed or minimized to determine a smallest number of analysis points sufficient to simulate execution of the program. This minimization may be performed using statistical analysis, and/or may be based on how well the clusters were formed (for example, how much difference between intervals was necessary to place or not place the interval into a cluster). Also, by sampling the intervals within a particular cluster for a hardware metric and/or a hardware-independent metric, a confidence and variance may be determined to test the effectiveness of the clustering. The confidence and variance can also be used to determine how a set of clusters is formed, and to determine a good clustering. Furthermore, to improve efficiency and, if desired, perform an analysis at runtime, tracked statistics or clusters, for example, may be reduced.

In another embodiment, several clusterings are formed, and heuristics may be used to choose an optimum clustering. Heuristics may be used to determine how similar intervals are within a cluster (based on statistics). For example, heuristics can be used to determine how similar clusters are using distance of intervals, and another example uses a Bayesian Information Criterion (BIC). The heuristics may be based upon using variance and/or confidence information.

According to an embodiment of the present invention, an exemplary system and method identifies similarity and phase-based behavior by tracking a component, for example a hardware-independent metric such as, but not limited to, the executed code for the software. This component is tracked for a statistic such as, but not limited to, frequency of execution. This concept is based upon an observation that variance in a program's behavior is caused by different parts of a program being executed. Therefore, the variance in this embodiment can be classified by reference only to the behavior of an application based on the code being executed over time.

The similarity and phase behavior found at the code level shows highly correlated similarity and phase-based behavior for other metrics, including hardware, operating system, and run-time system metrics. By only examining a hardware-independent metric such as the software's executed code, one can find similarity and phase-based behavior of hardware metrics, operating system performance, and run-time systems. This provides, among other advantages, a lower required time, and more generality. However, hardware metrics may additionally or alternatively be tracked.

Embodiments of the present invention additionally may provide, for example, the use of difference graphs, signal theory, Fourier transforms, and/or clustering to classify similar execution and phase-based behavior accurately. Embodiments also provide efficient techniques for dealing with large data sets, by using random projections to map a large number of dimensions to a small number of dimensions without significant loss of accuracy.

Using the speed at which one can perform similarity and phase-based software analysis according to preferred embodiments of the present invention, applications include, but are not limited to: finding representative analysis points, estimating and predicting machine performance, optimizing static and dynamic phase-based software and hardware, and using profile-based analysis tools to examine similarity and phase-based software behavior. A profiler could be used, for example, to better tune a code and take advantage of the behavior found.

To evaluate new architecture features, detailed modeling of the pipeline, buses, and queuing delays is needed along with timing models and power estimation. Detailed simulation takes a great deal of processing power and time, and thus only a small subset of a whole program is often simulated. Simulating the full execution of an industry standard benchmark can take weeks to months to complete. To overcome this problem researchers choose a very small portion of a program's execution to evaluate their results, rather than simulating the entire program.

Another method of the present invention determines a small set of intervals of execution, termed herein analysis points, for representing all or portions of a computer program. One or more of these analysis points may be selected from each identified phase. For these analysis points to be most useful they should, combined, accurately model complete execution of the program at the hardware, operating system, runtime, and software level. These analysis points can then be used to model the complete execution of a program accurately. Analysis points may also be used for such purposes including, but not limited to: program analysis, guiding optimization, security analysis, and others.

Comparing identified behavior may be used for, among many other uses, determining the starting points in a program for analysis and the duration of the analysis. This approach preferably can be used to find one or more of: (1) the end of the initialization part of the program, and the start of the cyclic part of the program; (2) the period of the program (the period is the length of the cyclic nature found during a program's execution); (3) the ideal place to analyze given a specific number of instructions one has time to simulate; and (4) an accurate confidence estimation of the analysis point.

Still another embodiment of the present invention provides, among other features, a unified phase-tracking algorithm and architecture for hardware or software that can efficiently capture, classify, and predict program behavior, all at run-time, with little or no support from software. Accordingly, generic phases can be found that correspond to changes in behavior across many metrics. By classifying phases generically, one can avoid the need to identify phases for each optimization, and thus a unified prediction scheme is provided that can forecast future behavior. In a preferred method, the phase-tracking architecture accurately captures phase behavior of a program's execution with respect to one or more of a number of metrics including, but not limited to, overall performance (as measured by IPC) branch prediction, cache performance, and energy. In this way, the phase behavior may be captured efficiently using a comparatively simple predictor.

In an exemplary embodiment, by tracking a component for a statistic, an interval vector (IV) may be created, which can concisely summarize the behavior of an arbitrary section of execution in a program. An interval vector as used herein refers to a preferably single-dimensional array representing a particular sampled interval, where there is an element for each of a program component, and preferably for each component in the program (or a subset of the program). By using interval vectors, one can capture the behavior of programs as defined by several architectural metrics (such as IPC, and branch and cache miss rates).

A preferred analysis method, termed herein Interval Distribution Analysis (IDA), identifies behavior by using profiles of a program's code structure to uniquely identify different phases of execution in the program. A unique interval vector for a particular interval is referred to herein as an interval signature.

One exemplary, nonlimiting code structure that may be used is basic blocks of a code, and frequency is an example of a statistic. When running a program (a subset or entire program) to completion, it will execute each basic block a certain number of times. Taking a snapshot of the number of times each basic block is executed over an interval, in this example, provides the interval signature.

Interval signatures gathered for small portions of the program's execution are used to find behavior, and behavior may be compared to identify, for example, representative areas of the program to analyze. In an exemplary method, this is done by finding the best match of these smaller interval signatures to an interval signature representing the complete execution of the program. IDA preferably only requires program component profiles to track a statistic (though others may also be used), which means that a relatively fast profiler preferably may be used (as opposed to slow timing simulation).

Referring now to the drawings, FIG. 1 shows the behavior of wave as it executes. Plotted on the graph are a variety of architectural metrics such as IPC and cache miss rates. The graph shows that wave has very distinct phases of execution, starting with an initialization phase that ends at around seven billion instructions. After this, the program enters into a series of cycles, each made up of two phases. In one phase an average of over three IPC is achieved every cycle, while in the other phase the IPC drops down to fewer than two.

Figure 2:
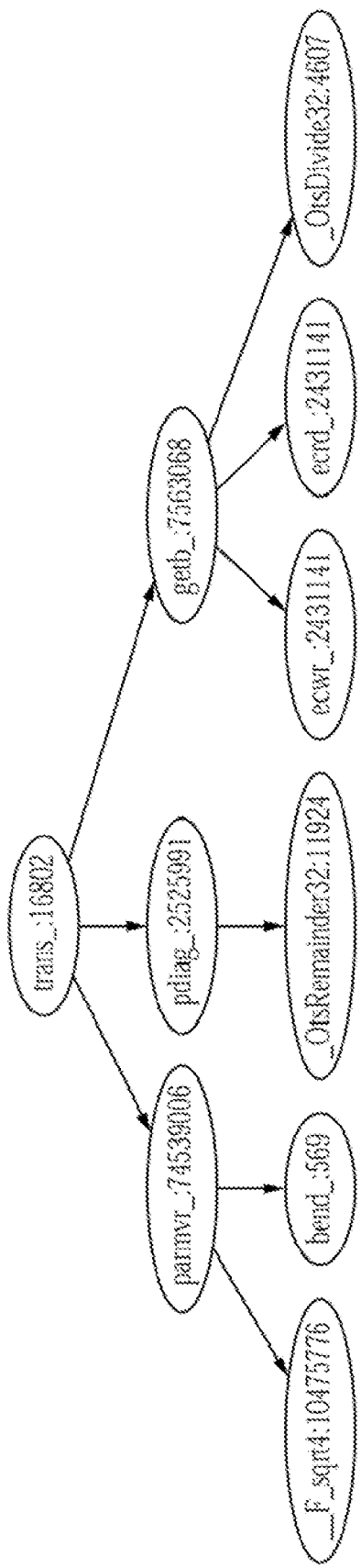
FIG. 2 is a call graph generated from a phase of execution of the program wave, where an IPC of three is achieved, as observed according to an embodiment of the present invention.
Figure 3:
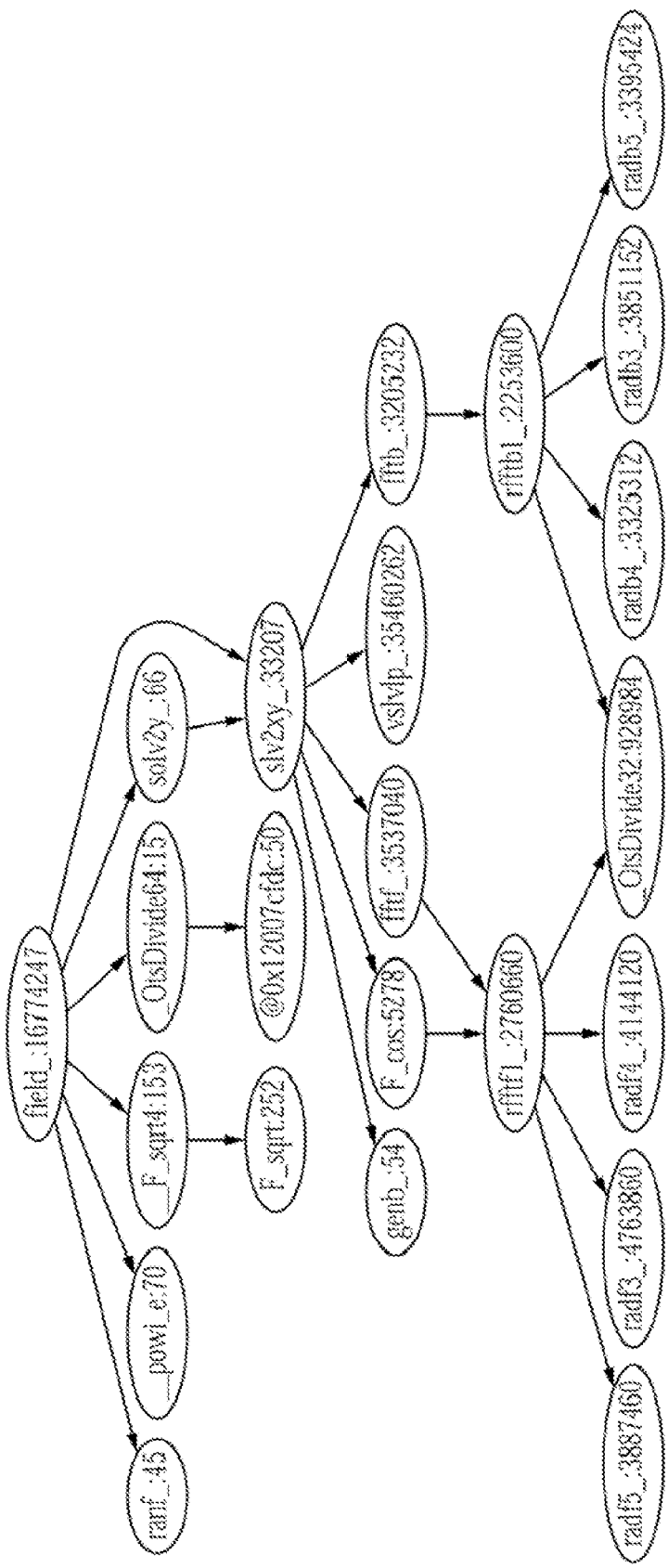
FIG. 3 is a call graph generated from another phase of execution of the program wave, where there is an average IPC of 2.
Figure 4A:
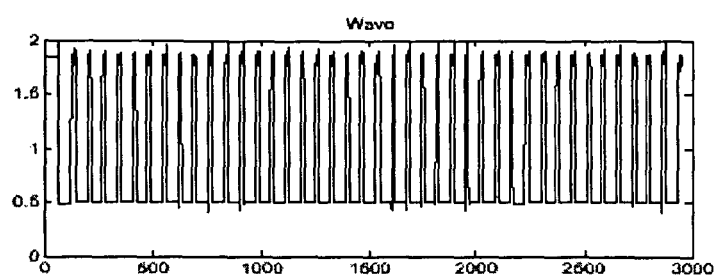
FIGS. 4A-4F are a number of interval difference graphs for programs wave, hydro, tomcat, vpr, vortex, and bzip respectively, formed using an exemplary method of the present invention.
Figure 4B:
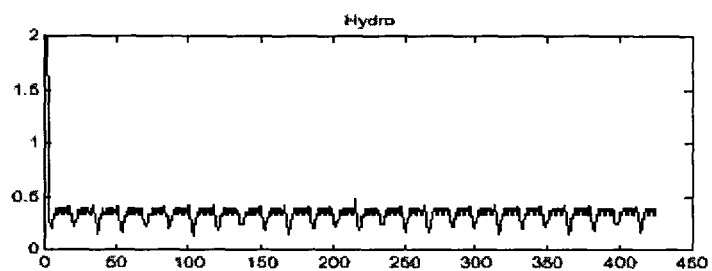
Figure 4C:
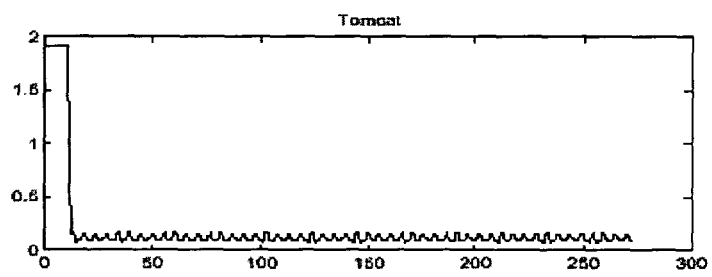
Figure 4D:
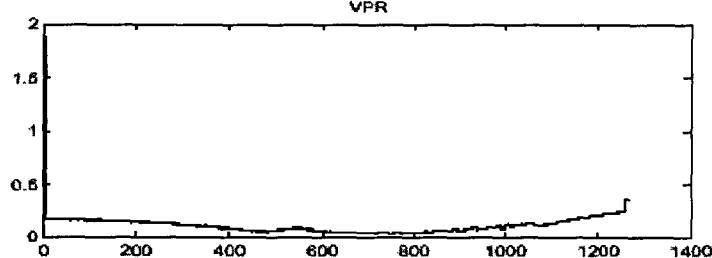
Figure 4E:
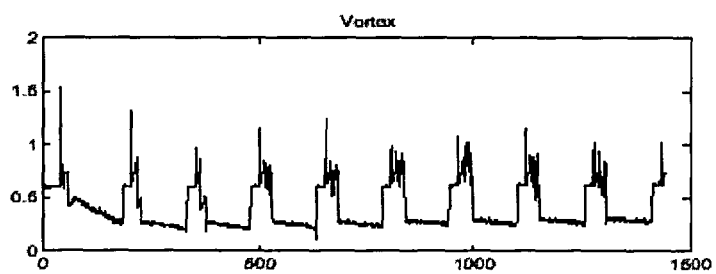
Figure 4F:
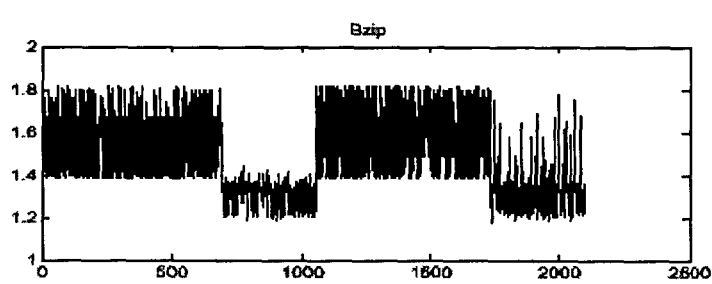
Figure 5A:
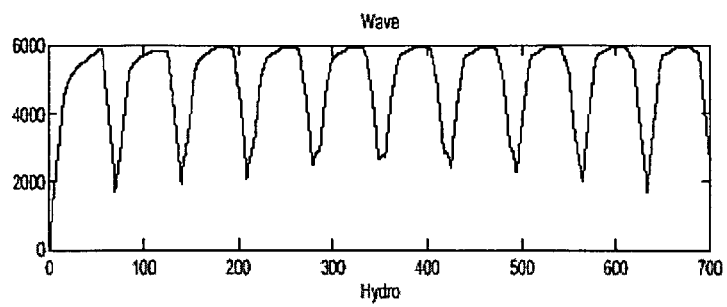
FIGS. 5A-5F are initialization difference graphs for programs wave, hydro, tomcat, vpr, vortex, and bzip respectively, formed using an exemplary method of the present invention.
Figure 5B:
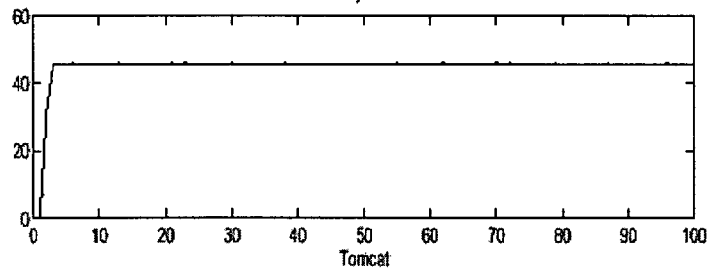
Figure 5C:
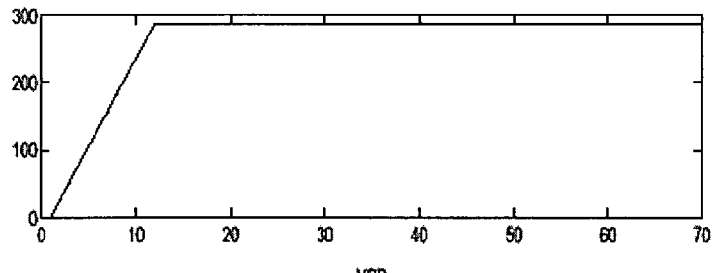
Figure 5D:
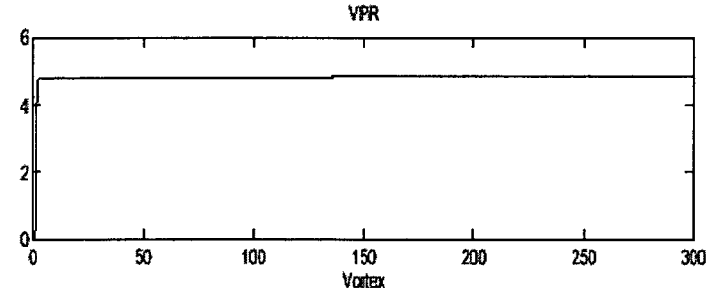
Figure 5E:
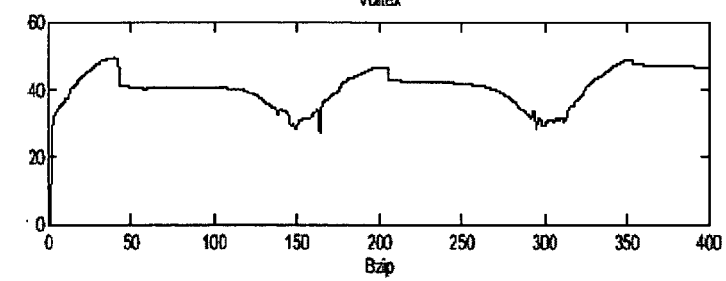
Figure 5F:
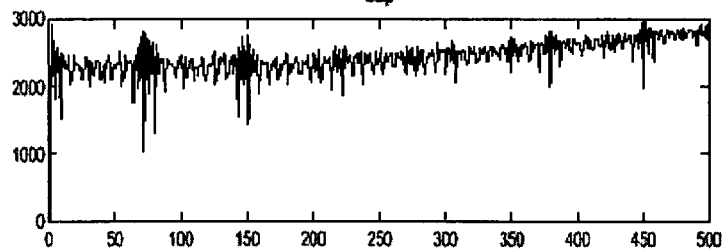
Figure 6A:
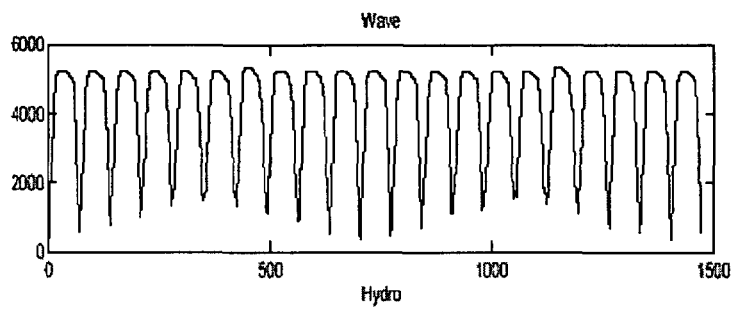
FIGS. 6A-6F are interval difference graphs for programs wave, hydro, tomcat, vpr, vortex, and bzip respectively, formed using an exemplary method of the present invention.
Figure 6B:
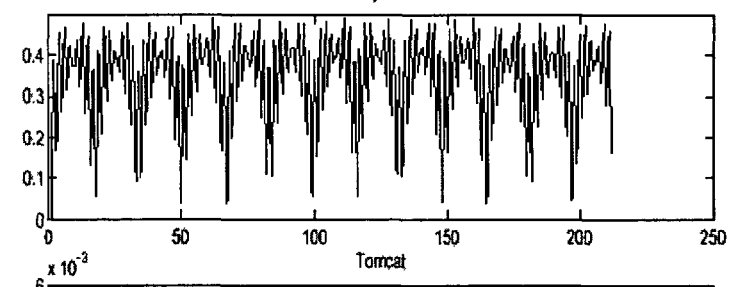
Figure 6C:
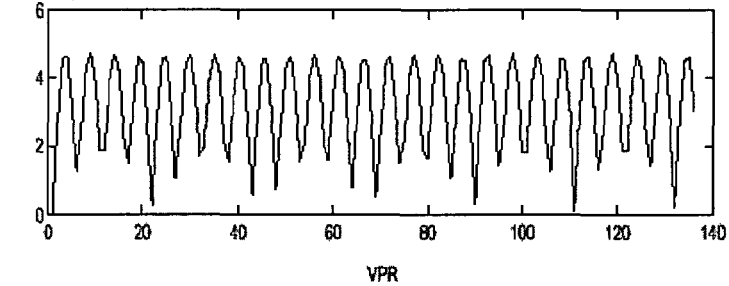
Figure 6D:
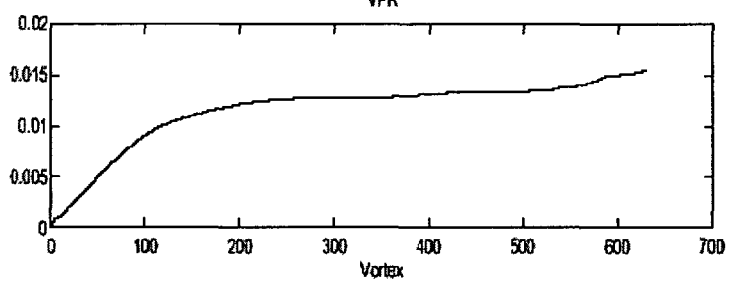
Figure 6E:
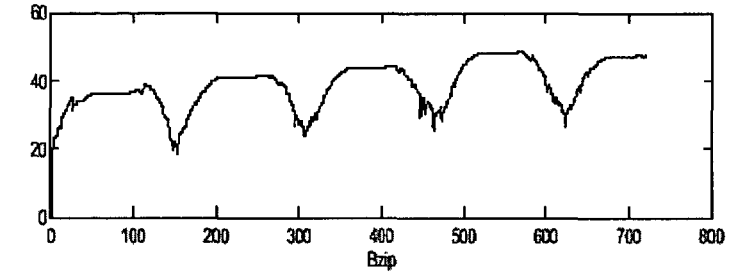
Figure 6F:
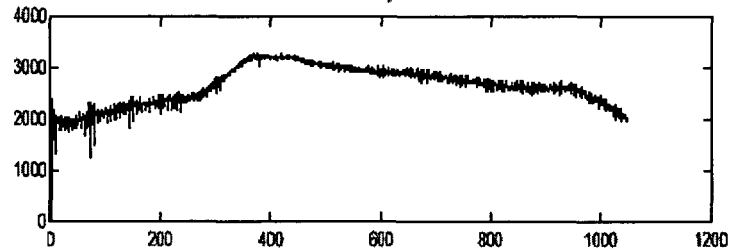

The reason for this periodic behavior can be seen in the call graphs generated for wave shown in FIGS. 2 and 3. FIG. 2 is the call graph generated for just the partial execution of wave during the sections of high IPC, while FIG. 3 is the call graph for the sections of low IPC. The nodes on the graphs are procedures annotated with the number of times that they were called. The strong periodic behavior of wave is due to an outer function, not shown, calling two different routines in succession, trans and field. The call graphs show that trans and field do share some low level functions such as _F_sqrt4 and _OtsDivide32, but the bulk of their execution occurs in different functions.

If careful decisions are not made regarding where in a program's execution to simulate, one could easily see differences of a factor of two in important metrics such as IPC. According to embodiments of the present invention, different phase behavior can be identified by examining the execution behavior of the code using a hardware metric (such as IPC) or a hardware-independent metric (such as the code).

According to an exemplary, nonlimiting embodiment of the present invention, a general, automated technique is provided for determining where to analyze a program by identifying similar sections of execution. In an exemplary method, behavior of intervals of execution is identified using a program component of the code, and more particularly using basic blocks of the program. A basic block as referred to herein is a section of code that is executed from start to finish with one entry and one exit. As an exemplary statistic, the frequency with which basic blocks are executed is tracked to identify a behavior and to compare different sections of the application's execution. One benefit of this exemplary embodiment is that the behavior of the program at a given time is directly related to a hardware-independent metric such as the code it is executing at that time, and basic blocks are one, nonlimiting way to provide this information. However, basic blocks, or hardware-independent metrics, are not the only possible components.

According to this exemplary method, the program, when run for an interval, will execute each basic block in the program a certain number of times. Knowing this information provides an interval signature for that interval of execution, which tells where in the code the application is spending its time. Generally, an embodiment of the present method finds a reasonably-sized interval of time in the program's execution that has an interval signature similar to the full execution of the program. If this can be found, both the full execution of the program and the selected interval spend proportionally the same amount of time in the same code, and the performance of those two intervals should be similar.

In a particular embodiment, interval signatures are collected in intervals in the form of groups of instructions, as a nonlimiting example, 100 million instructions, throughout the execution of a program. At the end of each interval, for a frequency statistic, the number of times each program component is entered during the interval is recorded, and a new count for each program component begins for the next interval.

For an IV with basic blocks as a component, there is an element for each of a number of basic blocks, respectively, and preferably for each static basic block in the program. If the statistic is frequency, each element in the array is the count of how many times a given component (such as the basic block) has been entered during the interval. Each element may, but need not, be multiplied by the number of instructions in each program component, to insure that instructions are weighed the same regardless of whether they reside in a large or small basic block.

The intervals of execution according to the present invention need not be equal, but instead may vary, for example, in time, number of instructions, etc. In fact, it can be useful to take IVs of varying size intervals. An IV that was gathered by counting basic block executions over an interval of N×100 million instructions, for example, may be referred to as an IV of duration N. This, however, is merely exemplary.

Because the actual count of program component executions for a given interval is not itself important, but rather the proportions of program component execution, an IV preferably is normalized by dividing each element by the sum of all the elements in the IV. This normalization ensures that the sum of all the elements in the IV is equal to 1, which in turn allows a comparison of IVs of different durations.

An IV that contains the normalized program component frequencies for the entire execution of the program is referred to herein as a target IV. A next step of a preferred embodiment thus finds an IV of relatively small duration that is very similar to the target IV. By finding this, one will have found a section of code that is representative of the whole.

To find an IV that is similar to the target IV, one must have some way of comparing two IVs. A preferred operation takes as input two IVs, and as output has a number which reveals how close they are to each other. There are several ways of comparing two vectors to one another, such as taking the dot product or, preferably, finding the Euclidean or Manhattan distance, and the present invention is not intended to be limited by a particular method of comparison between intervals of execution.

The Euclidean distance can be found by treating each vector as a single point in D-dimensional space. The distance between two points is simply the square root of the sum of squares just as in $c^2=a^2+b^2$. The formula for computing the Euclidean distance of two vectors, a and b, in D-dimensional space is given by:

$$EuclideanDist(a, b) = \sqrt{\sum_{i=1}^{D} (a_i - b_i)^2}$$

The Manhattan distance, on the other hand, is the distance between two points if the only paths you can take are parallel to the axes. In two dimensions this is analogous to the distance traveled if one were to travel by car through city blocks. This has the advantage that it weighs more heavily differences in each dimension (being closer in the x-dimension does not get one any closer in the y-dimension). The Manhattan distance is computed by summing the absolute value of the element-wise subtraction of two vectors. For vectors, a and b, in D-dimensional space, the distance can be computed as:

$$ManhatDist(a, b) = \sum_{i=1}^{D} |a_i - b_i|$$

In a preferred comparison method, the element-wise subtraction (Manhattan distance) of the two IVs is taken. Manhattan distance has been found to represent differences in high-dimensional data more accurately (though its use is not required). The absolute value of each element is taken, and all of the elements are summed to provide a single number. This number is preferably between 0 and 2, since each normalized IV preferably sums to 1. This single number (termed the difference) is used to determine how closely related two IVs are.

With a way of comparing two IVs, it can be determined how the execution of a program changes over time. To understand how to find a representative interval of the program, one needs to understand how the execution of a program changes over time. For this reason, in a preferred method, a difference graph referred to as an Interval Difference Graph (IDG) is created, which is a plot of how well each individual sample in the program compares to the target IV created for the entire run to completion.

In a preferred approach, for each interval, an IV is created of duration 1, and its difference from the target IV is calculated. FIG. 4 shows the plot of all of the IV differences across the entire execution creating an exemplary IDG. The x-axis is the number of instructions in intervals of 100 millions, and the y-axis is a measure of comparison between IVs; that is, the IV difference. A difference of 2 means that the two vectors are completely unrelated, while a deviation of 0 is the result of a perfect match between an IV and the target IV. The IDG can be used to find the initialization phase of the program, and find the period for that program.

Many programs have wildly different behavior during different parts of their execution, making the section of the program's execution simulated of great importance to the relevance and correctness of the study. Execution during the initialization phase of programs is very different from the steady state behavior of the application. Accordingly, results generated for only the beginning of execution can be very misleading, and it is thus beneficial to analyze representative sections of code.

A preferred approach used to determine the end of the initialization phase can be thought of as sliding a piece of jigsaw puzzle over the rest of the puzzle. Since the jigsaw piece will fit best at the spot it is removed from, the comparison at that point will show the least difference. However, as soon as it is shifted away from its space, the comparison with the underlying pieces will show a marked difference.

To find the end of the initialization phase, in an exemplary embodiment, the IDG is treated as a signal. For example, a first amount, such as the first quarter of the IDG (signal), referred to herein as an Initialization Representative Signal (IRS), may be used to search for the end of the initialization. The IRS is slid over the IDG to search for the first peak where the IRS differs from the IDG. In this way the IDG acts as the puzzle, and the IRS acts as the piece of the puzzle one is sliding across.

In an exemplary embodiment of the method, the IRS is chosen to be the first quarter of the IDG signal to capture the majority, if not all, of the initialization stage. This is based on an assumption that the initialization phase will be shorter than half the length of the entire execution, though this is not required.

The IRS is compared at every point across the first half of the original IDG. A signal starting at each point in the IDG, equal in length to the IRS signal, is compared to the IRS. For example, to compare these two sub-signals, one can take the absolute difference of each point of the two sub-signals, and then summarize the resulting differences into a single number. This number represents how close these two signals match up. Preferably, this is done for every point within the first half of execution in the IDG, resulting in a new graph, which is referred to herein as an Initialization Difference Graph. Example Initialization Difference Graphs are shown in FIG. 5.

The exemplary graphs shown can be categorized into two observable behaviors. A periodic pattern, as seen with wave, vortex, and bzip, is due to the IRS containing the initialization stage as well as some cyclical behavior from the execution. This is enough to manifest the cyclical behavior during the remainder of the comparison past the initialization stage. A steep incline with a plateau is seen with hydro, tomcat, and vpr. The plateau is explained by the initialization part of these programs not having any overlap with the rest of the program after the initialization phase is completed.

From the exemplary programs shown, the initialization stage is complete at the first peak or corner in the initialization difference graph. When the IRS finally reaches the end of the initialization stage on the IDS, the difference is maximized because there is no more of the initialization phase left with which to compare.

Mathematically, a peak or a corner in a graph represents the point where the slope is changing the fastest. The second derivative is a function of the rate of change of the slope, and is used in a preferred embodiment of the present invention to determine this point marking the end of the initialization. The first column in FIG. 10 shows the end of initialization points that are automatically found using the above analysis.

Most programs do not execute in a steady state, even at a high level. Instead, they tend to go through different stages of execution, starting with a setup phase that is used to initialize data structures and set up for the rest of execution. This start-up time can account for a significant amount of execution. For example, the SPEC95 program wave needs to execute for almost 7 billion instructions before it reaches the code that accounts for the bulk of the execution.

Once the initialization stage has been passed and the bulk of the execution begins, there are still execution phases to be found. Programs tend to be written in a modular fashion, often as a set of procedures contained in a loop, where each procedure is then another loop with more procedures. While this mode of execution is not representative of every important program written, it is the common case for compute bound applications, the type that one is concerned with when examining, for example, new architectural modifications. Applications, when written in this manner, have a very strong periodic behavior, alternating between completely different sections of code.

If one is not cognizant of the fact that programs execute in distinct phases, testing the performance of a machine may be conducted on a single, very unrepresentative section of execution such as the initialization phase, or at the very least the test may be over-representing parts of the program. For example, the SPEC95 program wave shows two main phases to its cycle. It has an IPC of 3 during the 1st phase, and an IPC of 2 during the 2nd phase, and this repeats throughout its execution. The period is the length of time it takes to complete both phases of its cycle.

With the end of the initialization stage found, the period may be determined. Preferably, the period is found by first forming a Period Representative Signal (PRS) from the IDG, starting at the pre-computed end of the initialization stage. The PRS preferably used is one-quarter of the length of the program's execution. This duration typically is sufficient to capture periods of length (duration) comprising up to half of the program's execution, though it is contemplated that this duration may vary.

In a preferred method to find the period, the PRS is slid across half of the entire IDG, starting at the end of the initialization stage. The same comparisons for each x-axis value preferably are performed as disclosed above for finding the initialization stage, resulting in graphs referred to herein as Period Difference Graphs, and as shown in FIGS. 6A-6F.

The period graph shows all of the points where the PRS matches the sub-signals from the original signal (IDG). After shifting the PRS over the IDG, the resulting calculations close to zero represent a match of the PRS to the original sub-signal. The time duration between each match represents the period for the program. Therefore, preferably all of the local minimums from shifting the PRS are used to calculate the period. The period may be calculated, for example, by taking these minimum y-axis points in the period graph, and calculating the length in instructions (x-axis) between these minimums. This calculated length is the period of the signal, and the period of the application. The second column in FIG. 10 shows the periods that are automatically found using the above analysis.

In the example shown, two programs do not fit cleanly into the description for finding periodic behavior: vpr and bzip. Vpr does not have a very visible period, and its behavior is not very repetitive. However, one can still find very good representative points for analysis for vpr.

Figure 7A:
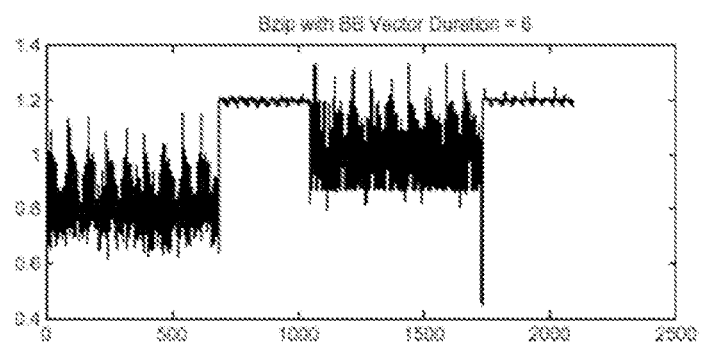
FIGS. 7A-7C are interval difference graphs for bzip, for durations 6, 12, and 52, respectively.
Figure 7B:
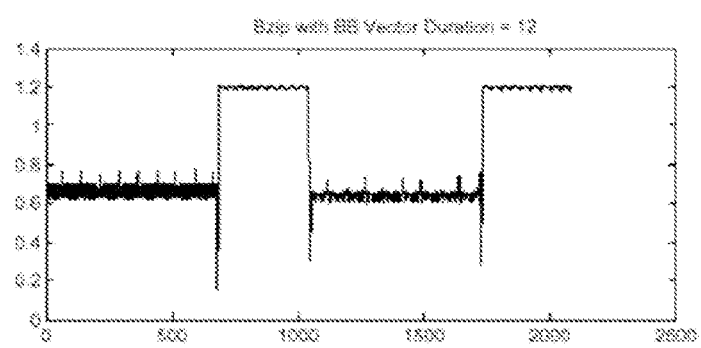
Figure 7C:
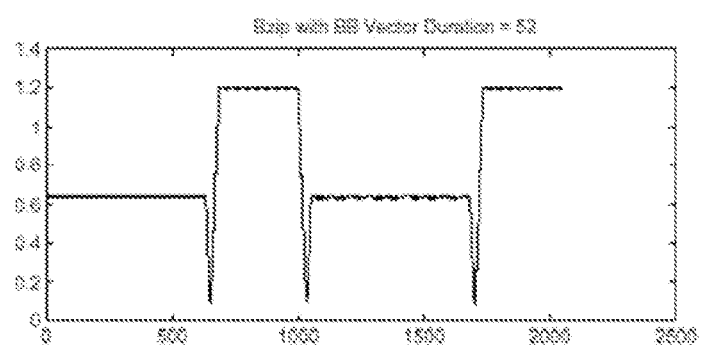
Figure 9A:
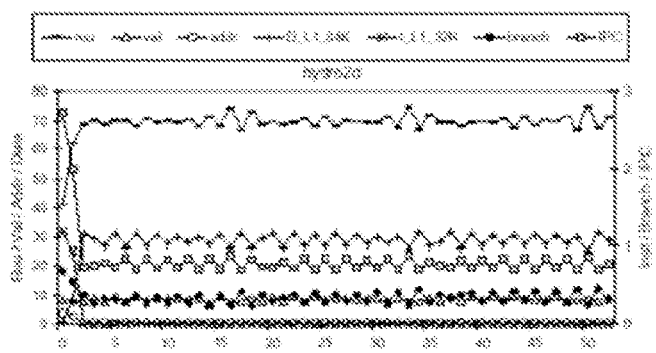
FIGS. 9A-9E are graphs showing time-varying behavior for programs hydro2d, tomcatv, bzip, vortex, and vpr, respectively, across architectural metrics.
Figure 9B:
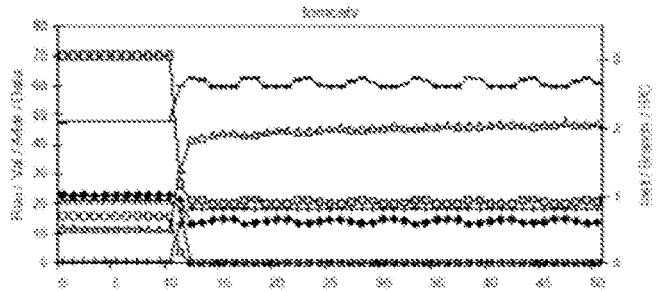
Figure 9C:
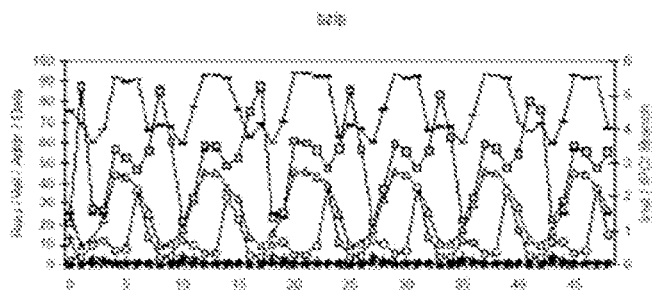
Figure 9D:
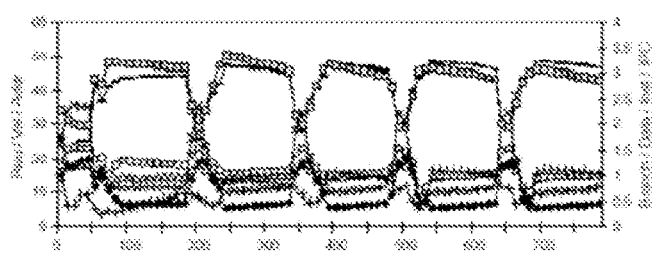
Figure 9E:
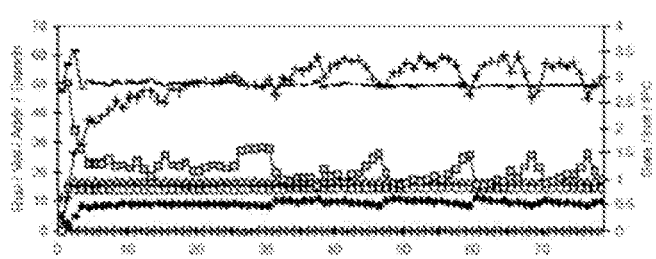

Bzip, on the other hand, has multiple periods. The first and largest period has a duration of 1046 as seen in FIG. 4, which consists of two cycles over the complete execution of bzip. Reviewing FIGS. 7A-7c, it can be seen how the behavior is captured when creating an IDG using different interval durations. Results are shown for using IVs with durations of 6, 12, and 52 (in hundreds of millions of instructions) to create the IDG. For an IV duration of 6, it can be seen that the next period to be found has a duration of 78, and the smallest period is of size 9. FIGS. 7A-7C also show that using larger durations of an IV creates an IDG that emphasizes the larger periods.

It is contemplated that Fourier analysis, such as a Fast Fourier Transform, may instead be used to discover the period of a signal. For example, the signal may be convolved with itself to smooth out the IDG, emphasizing the frequencies with larger amplitude. The convolution accentuates the periodic behavior of the original signal, but this new signal still had to be analyzed to find the period. However, this convolution may not work as well for signals that did not have static period lengths. Fourier analysis, though, may have benefits when dealing with certain types of execution.

In an exemplary operation of IDA, to examine behavior over intervals of execution using architecture features and metrics, information was collected for three SPEC95 programs (tomcatv, hydro, and wave) and three SPEC 2000 programs (bzip, vortex, vpr) for their reference input sets. Each program was compiled on a DEC Alpha AXP-21164 processor using the DEC C, C++, and FORTRAN compilers. The programs were built under OSF/1 V4.0 operating system using full compiler optimization (−04-ifo).

The timing simulator used was derived from the SimpleScalar 3.0a tool set, a suite of functional and timing simulation tools for the Alpha AXP ISA. The simulator executes only user-level instructions, performing a detailed timing simulation of an aggressive 8-way dynamically scheduled microprocessor with two levels of instruction and data cache memory. Simulation is execution-driven, including execution down any speculative path until the detection of a fault, TLB miss, or branch misprediction. The baseline micro-architecture model is detailed in FIG. 8. The 3.0a release of SimpleScalar was modified so that the memory hierarchy buses were pipelined, with a transfer width of 8 bytes per cycle.

To show the varying behavior of the programs, SimpleScalar also was modified to output and clear its statistics after every 100 million committed instructions. Only the statistic counters were cleared between intervals. Information relating to the state of the machine (e.g., cache and branch prediction tables) was not cleared between intervals. This eliminated any cold-start error from being added.

Results were then graphed for every 100 million committed instructions for the programs examined, as this exemplary interval was believed in this example to yield a clear picture of the large scale runtime behavior exhibited by each application as well as indicating which sets of instructions are more indicative of the execution as a whole. It is, however, of small enough granularity that it provides useful information about program start up times and can be easily simulated on any machine.

Each program was run until completion, but only enough intervals were graphed to show the cyclic nature for each program. The following summarizes the data graphed:

Instructions Per Cycle (IPC). This is the number of instructions that are committed in each sample, which is always, in this example, 100 million, divided by the number of simulated cycles that it took to execute those instructions.

Percent RUU Occupancy. SimpleScalar uses a unified Register Update Unit (RUU) to model its reorder buffer and reservation stations. In the exemplary simulations, a 128 entry RUU was used, and results were reported in terms of the percent of the RUU entries used on average during a 100 million instruction sampling period.

Cache Miss Rate. Cache miss rates are shown for a 32 KB 2-way associative instruction cache, and a 64 KB 4-way associative data cache. Both caches have 32 byte lines.

Branch Prediction Miss Rate. In an exemplary method, a bi-modal gshare branch predictor was used, as disclosed in S. McFarling and J. Hennessy, "Reducing the cost of branches," 13$^{th}$ Annual International Symposium of Computer Architecture, pages 396-403, Association for Computing Machinery. An 8K entry 2-bit chooser table is used to choose between an 8K entry 2-bit bi-modal branch predictor and an 8K entry gshare table. A 256 entry 4-way associative branch target buffer is used to provide the predicted addresses, and a 32 entry return address stack is used to predict return instructions. The branch misprediction rate over all the types of executed branch instructions is shown.

Address Prediction Miss Rate. Miss rates are shown for 2-delta stride address prediction for an infinite sized table (each load gets its own entry). The 2-delta address predictor will only change its prediction if the stride is seen two times in a row. Miss rates are shown for only applying address prediction to load instructions.

Value Prediction Miss Rate. Miss rates are shown for 2-delta value and address prediction for an infinite sized table. The 2-delta value predictor will only change the stride if seen two times in a row. Miss rates are shown for only applying value prediction to load instructions.

In this example, address and value prediction were not used for architectural optimizations in gathering these results, only their miss rates were gathered. Therefore, they do not affect the IPC, branch, or cache miss rate results being shown.

FIGS. 9A-9E and FIG. 1 show the varying behavior of the SPEC programs that were examined across the different intervals. The legend is at the top of each figure. For each program, the results for IPC, average percent RUU occupancy, percent branch miss rate, percent value miss rate, percent address miss rate, and percent instruction and data cache miss rates are shown on the same graph. Because all of these different results are shown on the same graph, each graph has two y-axes.

For each graph, the left and right y-axes are labeled with the metrics that use that axis. For most of the graphs, percent RUU occupancy, and value and address miss rates use the left y-axis. Similarly, I-Cache miss rate, branch miss rate, and IPC usually use the right y-axis. The D-Cache miss rate is shown on either axis, depending upon the program and axis scale, to allow interesting trends to be seen.

The x-axis is in terms of 100 million committed instructions. All of the programs were run to completion, and were found to either (1) converge to a constant behavior until the last few hundred million instructions, or (2) have a repeatable cyclic behavior until the end of their execution. Because of this, and to save space, only enough of the program is shown to demonstrate the cycles found. For hydro, tomcat, and bzip, 5 billion instructions was enough to demonstrate the cyclic nature of the programs clearly. Vortex has cycles of a much larger scale, on the order of 150 billion instructions, and wave has cycles on the order of 7 billion instructions. Vpr has mild cyclic tendencies, but the pattern is not as concrete as for other programs.

SimpleScalar, as disclosed in, for example, "The SimpleScalar Tool ST, Version 2.0", Technical Report CS-TR-97-

1342, University of Wisconsin, Madison, June 1997, executes on the order of thousands of times slower than hardware. SimpleScalar emulates the execution of a program and allows the simulation to execute down speculative paths of execution. This is important for modeling speculative execution and recovery techniques accurately for many architecture features being studied in the field. It is common to use a cycle level simulator similar to SimpleScalar, executing only a small fraction of the program.

Typically, a few hundred million instructions may be executed, simulated, or otherwise analyzed starting from a predetermined point, referred to herein as an analysis point. The analysis point is a starting place for analysis (defined, for example, at a specific interval, or at a number of instructions executed from the start of execution) in a program's execution derived from IDA and/or other methods.

FIG. 10 shows the baseline behavior of the six programs for the architectural metrics used in this example herein, for the complete run of the application. In addition, the initialization phase and the period duration (in 100 of millions of instructions) is included as determined by using IDA with a basic block as a component. To get the most representative sample of a program, it is preferred that at least one full period be simulated.

To evaluate the accuracy of the period length found using IDA, the behavior of simulating for a single period is compared to that of simulating the program's complete execution. A preferred period is chosen as the analysis starting point by building an IDG for each program with an IV duration equal to the period length shown in FIG. 10. The minimum point in this new IDG is then taken as the preferred period for analysis; in this example, simulation.

FIG. 11 shows a comparison of the performance of several different metrics for the preferred period simulated with the baseline metrics shown in FIG. 10. The column labeled "start" is where the simulation was started, and the simulation ran for one complete period with the length shown in FIG. 10. For each of these experiments, cold start effects were eliminated by warming up the simulator with the full execution of the program to that point. The metrics examined are the same as mentioned herein. In addition, an error is associated with each metric. The error is the percent difference between the metric measured over the preferred period that was simulated versus the complete execution of the program.

The IPC values for the periods simulated match very closely with the execution of the program as a whole. For all the programs there was less than a 5% difference between the IPC of the preferred simulation period and the full program execution. Most of the other metrics match up very closely as well. The Figures show '-' for instruction cache error results for most of the programs, since the instruction cache miss rates were too low (below 0.05%) to represent any meaningful error.

The results for vpr show that IPC was captured within 4.3% when simulating 200 million instructions (one period), starting 74.6 billion instructions into the program. Even though there are different program components (here, basic blocks) executing in different proportions across the run of the application, the chosen sample is still very close to the execution as a whole.

Due to time constraints, one cannot typically analyze (for example, simulate) the whole program, but instead can analyze only for a few hundred million instructions, which is usually smaller than the period. To determine where to analyze given this constraint, a preferred method builds an IDG for each program with an IV duration of N, where N is the number of instructions (in hundreds of millions) the user is willing to simulate. Preferably, then, the minimum point of that graph is taken to represent the ideal analysis point.

FIG. 12 shows the effect of using only a limited amount of simulation time. As shown in the example of FIG. 12, the amount of simulation time was limited to only 300 million committed instructions, starting at the instruction, in hundreds of millions, shown in the first column of FIG. 12. As shown, the error rate has gone up over that in FIG. 11. However, because the starting point was carefully selected with the above preferred algorithms, the results in this example were within acceptable bounds. The worst case IPC difference is 6%.

The one program that does not do well with the smaller run size is bzip. For bzip, the address miss rate and the value miss rate are off by around 80%. As the periodic results show, 900 million simulated instructions are needed to capture the small period in bzip, and simulating for 300 million instructions was simply too small to capture the behavior of the loop. However, this limited simulation was still successful for the majority of programs tested, and programs such as bzip may be analyzed by other methods herein, such as selection of multiple analysis points.

For comparison, performance of choosing an analysis point for simulation to be just after the initialization phase is examined. FIG. 13 shows the same metrics as presented in FIG. 12 for a section of execution past the initialization stage by one period. The start of simulation is chosen to be the initialization time plus the time for one period. The theory behind this is to simulate the earliest time past initialization, while still allowing for a full period of simulation to warm-up the architectural structures such as the cache and branch predictor. In looking at FIG. 13, it can be seen that using this scheme provides higher errors for important metrics such as IPC, branch prediction and data cache miss rates, versus using IDA to find a preferred starting point as shown in FIG. 12.

Statistics for components other than hardware-independent metrics such as basic blocks are contemplated as well. As another nonlimiting example, one can try to find phase behavior by creating an IV where the components include both (1) branch instructions, and (2) load instructions. The statistic being gathered for branch instructions, for example, could be a number of branch mispredictions that occur for each individual branch instruction and the number of cache misses for each individual load instruction both gathered via hardware counters or simulation. The length of the interval in this example would be the number of branch and load instructions executed during the gathering of the interval vector. The interval vectors may then be normalized by this length and then directly compared to find their similarity. It will be understood by those in the art that various other combinations of statistics, program components, and intervals exist, and these examples should not be taken as limiting the invention to these exemplary methods.

A preferred embodiment of IDA accurately finds analysis points, but some of these periods are still too long for conducting detailed simulation studies. Therefore, in certain embodiments, a subset of instructions, such as a few hundred million instructions, may be selected to simulate from these long periods. An alternative approach is to use sampling simulation inside of a representative period found using IDA in order to maintain accuracy while reducing simulation time.

Various techniques are contemplated for sampling to estimate the behavior of the program as a whole. Such techniques typically take a number of contiguous execution samples across the whole execution of the program. These samples are spread out throughout the execution of the program in an attempt to provide a representative section of the application being simulated.

In sampling, it can be important to address the issue of how to deal with the state of the machine when switching from one cluster to starting the simulation of another cluster. One method for providing meaningful results is to first sample a large number of sequential instructions to provide results, due to the time it takes to warm up the architecture structures (e.g., caches), as well as taking a large number of samples to be sure to capture the large scale behavior of the program.

Understanding large scale program behaviors (for example, over billions of instructions) can unlock many new optimizations. These range from new thread scheduling algorithms that make use of information for when a thread's behavior changes, to feedback directed optimizations targeted at not only the aggregate performance of the code but individual phases of execution, to creating simulations that accurately model full program behavior. Other uses are contemplated as well. To enable these optimizations, one must first develop the analytical tools necessary to automatically and efficiently analyze program behavior over large sections of execution.

By tracking a statistic of a component, large scale behavior of programs can be explored, particularly the ways in which common patterns repeat themselves over the course of execution. IVs using program components, for example, are shown to be effective in capturing behavior of intervals of execution across several different architectural metrics (such as IPC, branch, and cache miss rates).

In addition to this, however, there is a need for a method of classifying these repeating patterns so that this information can be used for optimization. It has been found that this problem of classifying sections of execution is related to the problem of clustering from machine learning. In an exemplary method according to the present invention, steps are provided to find these sections quickly and effectively based on clustering. Preferred techniques, by comparing behavior of intervals of execution, automatically break the full execution of the program up into several sets, where the elements of each set are very similar. Once this classification is completed, analysis and optimization can be performed on a per-set basis.

An exemplary application of this cluster-based behavior analysis to analysis (for example, simulation) methodology for computer architecture research is provided. By making use of clustering information, one can accurately capture the behavior of a whole program by taking simulation results from representatives of each cluster and weighing them appropriately. A set of analysis points is determined, which when combined accurately represent the target application and input. In turn, this allows the behavior of even very complicated programs (such as gcc) to be captured with a small amount of simulation time.

In an example, analysis points are provided for Alpha binaries of all of the SPEC 2000 programs, after tracking frequency of basic blocks. In addition, these analysis points are validated using the IPC, branch, and cache miss rates found for complete execution of the SPEC 2000 programs.

In an exemplary method, both ATOM and SimpleScalar 3.0c were used to perform analysis and gather results for the Alpha AXP ISA. ATOM is used to gather profiling information quickly about the code executed for a program. SimpleScalar is used to validate the phase behavior found when clustering IVs, showing that this corresponds to the phase behavior in the programs' performance and architecture metrics.

The baseline micro-architecture model simulated in this example is detailed in FIG. 14. An aggressive 8-way dynamically scheduled microprocessor was simulated with a two level cache design. Simulation is execution-driven, including execution down any speculative path until the detection of a fault, TLB miss, or branch misprediction. All of the SPEC 2000 benchmarks compiled for the Alpha ISA were analyzed and simulated.

Given a method of comparing intervals of program execution to one another, phase-based behavior can be found. This phase behavior, seen in any program metric, is directly a function of the code being executed. Because of this, one can use the comparison between the IVs determined by tracking basic blocks as an approximate bound on how closely related any other metrics will be between those two intervals. However, basic blocks are used only as an example, and similar comparisons may be made between behaviors as identified by tracking other statistics and/or components.

Figure 15:
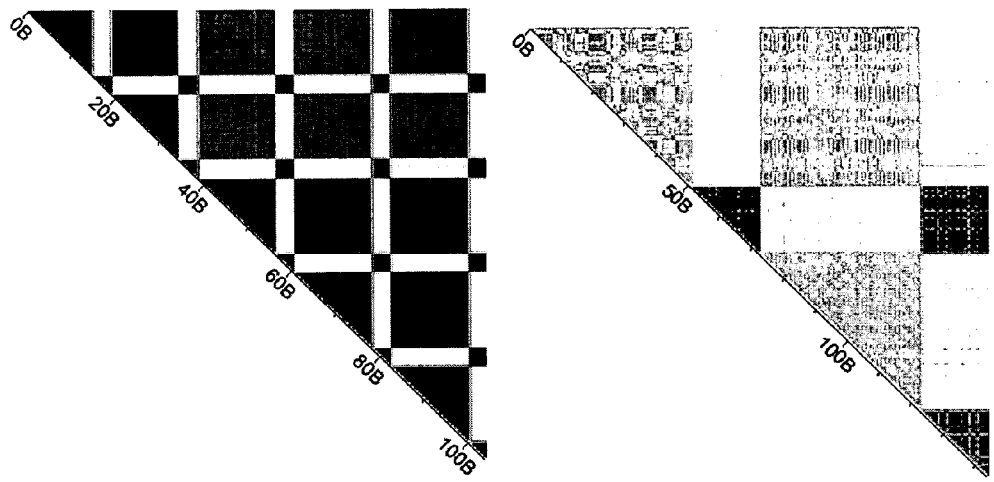
FIG. 15 is a graph showing interval similarity matrices for programs gzip-graphic and bzip-graphic created according to an embodiment of the present method.

For example, to find how intervals of execution relate to one another when basic block frequencies are tracked, a similarity matrix may be created. The similarity matrix is an upper triangular N×N matrix, where N is the number of intervals in the program's execution. An entry at (x, y) in the matrix represents the Manhattan distance between the IV at interval x and the IV at interval y. FIG. 15 (left and right) and 18 (left) show the similarity matrices for gzip, bzip, and gcc using the Manhattan distance. The diagonal of the similarity matrix represents the program's execution over time from start to completion. The darker the points, the more similar the intervals are (the Manhattan distance is closer to 0), and the lighter they are, the more different (the Manhattan distance is closer to 2). The top left corner of each graph shows the start of program execution and is the origin of the graph, (0, 0), and the bottom right of the graph is the point (N−1, N−1) where N is the number of intervals into which the full program execution was divided.

To interpret the graph, one starts considering points along the diagonal axis drawn. Each point is perfectly similar to itself, so the points directly on the axis all are drawn dark. Starting from a given point on the diagonal axis of the graph, one can compare how that point relates to its neighbors forward and backward in execution by tracing horizontally or vertically. To compare a given interval x with the interval at x+n, one simply starts at the point (x, x) on the graph and trace horizontally to the right until (x, x+n) is reached.

In an example of examining the phase behavior of programs, gzip is examined. The program gzip has behavior on such a large scale that it is easy to see. If an interval is examined from 70 billion instructions into execution, in FIG. 15 (left), this is directly in the middle of a large phase shown by the triangle block of dark color that surrounds this point. This means that this interval is very similar to its neighbors both forward and backward in time.

As shown, the execution at 50 billion and 90 billion instructions is also very similar to the program behavior at 70 billion. Additionally, the phase interval at 70 billion instructions is similar to the phases at interval 10 and 30 billion, but they are not as similar as to those around 50 and 90 billion. Compare this with the IPC and data cache miss rates for gzip shown in FIG. 16. Overall, FIG. 15 (left) shows that the phase behavior seen in the similarity matrix lines up quite closely with the behavior of the program, with five large phases (the first two being different from the last three) each divided by a small phase, where all of the small phases are very similar to each other.

The similarity matrix for bzip (shown on the right of FIG. 15) shows complicated behavior, with two large parts to its execution, compression, and decompression. This can readily be seen in FIG. 15 as large dark triangular and square patches. Even within each of these sections of execution there is complex behavior. This makes the behavior of bzip impossible to capture using a small contiguous section of execution.

Figure 16:
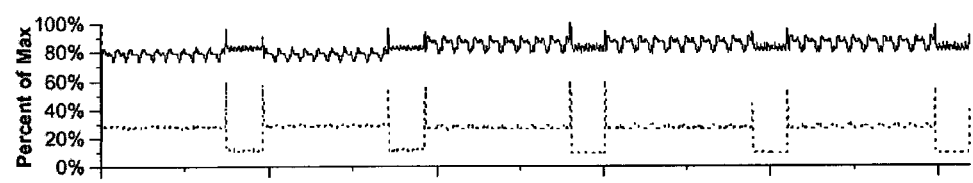
FIG. 16 is a time varying graph for gzip-graphic across intervals of program execution.
Figure 18:
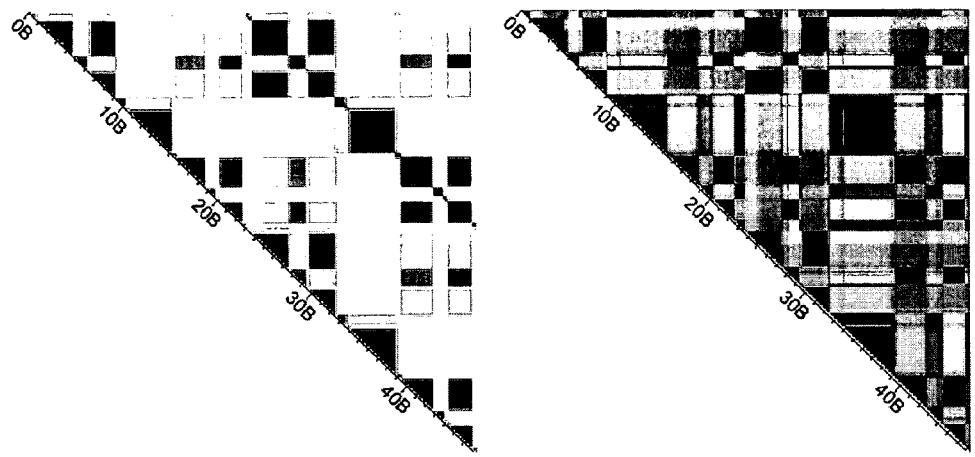
FIG. 18 is a graph showing an interval similarity matrix for program gcc and a similarity matrix for program gcc drawn from projected data, according to an embodiment of the present invention.
Figure 19:
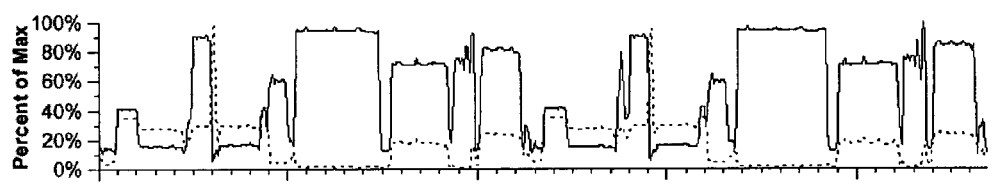
FIG. 19 is a time-varying graph for gcc-166, showing variation in average IPC and L1 data cache miss rate.

A more complex case for finding phase behavior is gcc, which is shown on the left of FIG. 19. This similarity matrix shows the results for gcc using the Manhattan distance, and shows that gcc does have some regular behavior. FIG. 19 shows that, even here, there is common code shared between sections of execution, such as the intervals around 13 billion and 36 billion. In fact, the strong dark diagonal line cutting through the matrix indicates that there is significant repetition between offset segments of execution. By analyzing the graph it can be seen that interval x is very similar to interval (x+23.6B) for all x. FIGS. 16 and 19 show time varying behavior of gzip and gcc. The average IPC and data cache miss rate is shown for each 100 million interval of execution over the complete execution of the program. The time varying results in this example graphically show the same phase behavior seen by looking at only the code executed. For example, the two phases for gcc at 13 billion and 36 billion, shown to be very similar in FIG. 18, are shown to have the same IPC and data cache miss rate in FIG. 19.

By examining the similarity between IVs, it is clear that there exists a high level pattern to each program's execution. To make use of this behavior, a preferred method of finding and representing the information is provided. Because there are so many intervals of execution that are similar to one another, one efficient representation is to group the intervals together that have similar behavior. This problem is analogous to a clustering problem.

Clusters may be used to identify phases of execution, and allows identification of one or more analysis points. The goal of clustering is to divide a set of points into groups, referred to herein as clusters, such that points within each cluster are similar to one another (by some criterion, often distance), and points in different clusters are different from one another. This problem arises in various fields, and as such it is an area of much active research. There are many clustering algorithms and many approaches to clustering. Classically, the two primary clustering approaches are Partitioning and Hierarchical.

Partitioning algorithms choose an initial solution and then use iterative updates to find a better solution. Popular algorithms such as k-means, (as disclosed in, for example, J. MacQueen, "Some methods for classification and analysis of multivariate observations," Proceedings of the Fifth Berkeley Symposium on Mathematical Statistics and Probability, Vol. 1, pages 281-297, Berkeley, Calif., 1967), and Gaussian Expectation-Maximization are in this family. These algorithms tend to have a run time that is linear in the size of the dataset.

Hierarchical algorithms, on the other hand, either combine similar points (called agglomerative clustering, and conceptually similar to Huffman encoding), or recursively divide the dataset into more groups (called divisive clustering). These algorithms tend to have a run time that is quadratic in the size of the dataset.

In an exemplary clustering algorithm according to the present invention, random linear projection is used followed by k-means. The k-means clustering algorithm is preferred because it is a fast and simple algorithm, and yields good results. To choose the value of k, for example, the Bayesian Information Criterion (BIC) score may be used. The following steps summarize a preferred algorithm:

1. Track behavior data over each interval of execution (for example, profile the basic blocks executed in each program) to generate IVs (for every X million instructions of execution, for example).

2. Reduce the dimension of the tracked data (such as IVs) to a smaller number of dimensions (for example, 15 dimensions) using random linear projection.

3. Try the k-means clustering algorithm on the low-dimensional data for k values 1 to N. Each run of k-means produces a clustering, which is a partition of the data into k different clusters.

4. For each clustering (k=1 . . . N), score the fit of the clustering using the BIC. Choose the clustering with the smallest k, such that its score is at least X % as good as the best score.

Regarding Step 2 above, in a preferred clustering algorithm, the problem of dimensionality should be addressed. All clustering algorithms suffer from the so-called "curse of dimensionality", which refers to the fact that it becomes extremely hard to cluster data as the number of dimensions increases. For basic blocks as a program component, the number of dimensions is the number of executed basic blocks in the program, which ranges from 2,756 to 102,038 for exemplary experimental data herein, and could grow into the millions for very large programs. Another practical problem is that the running time of a clustering algorithm depends on the dimension of the data, making it slow if the dimension grows too large.

Two exemplary ways of reducing the dimension of data are dimension selection and dimension reduction. Dimension selection simply removes all but a small number of the dimensions of the data, based on a measure of goodness of each dimension for describing the data. However, this throws away a significant amount of data in the dimensions, which are ignored. Dimension reduction reduces the number of dimensions by creating a new lower dimensional space and then projecting each data point into the new space (where the new space's dimensions are not directly related to the old space's dimensions). This is analogous to taking a picture of three-dimensional data at a random angle and projecting it onto a screen of two dimensions.

In a preferred reduction method, random linear projection is used to create a new low-dimensional space into which the data is projected. This is a simple and fast technique that is very effective at reducing the number of dimensions while retaining the properties of the data. Using a preferred random linear projection method, there are two principal steps to reducing a dataset X (which in this example is a matrix of IVs and is of size $N_{intervals} \times D_{numbb}$, where $D_{numbb}$ is the number of program components in the program) down to $D_{new}$ dimensions:

(a) Create a $D_{numbb} \times D_{new}$ projection matrix M by choosing a random value for each matrix entry between −1 and 1.

(b) Multiply X times M to obtain the new lower-dimensional dataset X' which will be of size $N_{intervals} \times D_{new}$.

Figure 21:
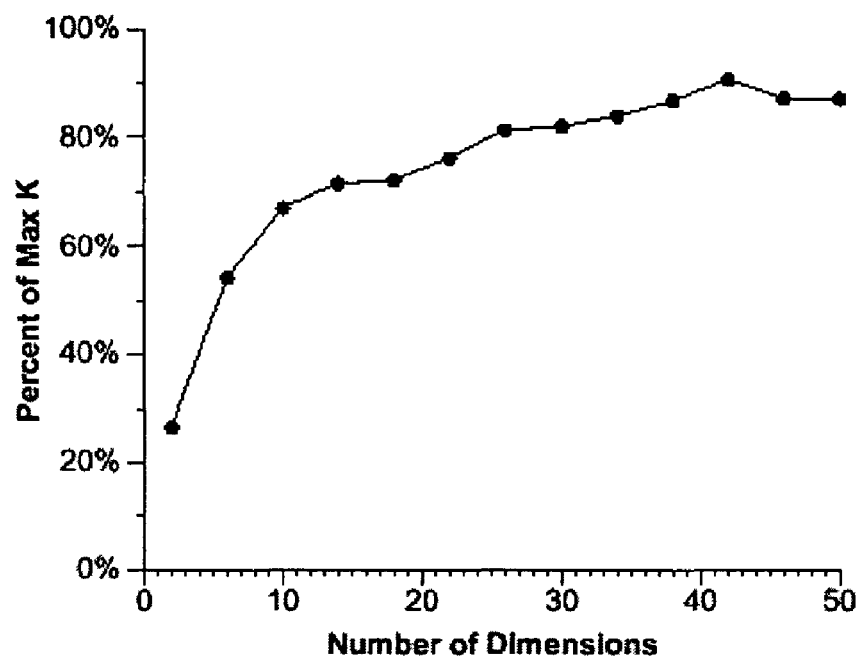
FIG. 21 is a graph showing a percentage of clusters found for a number of dimensions of interval vectors in an exemplary embodiment of the present invention.

For a preferred clustering algorithm, $D_{new}$=15 dimensions is typically sufficient to still differentiate the different phases of execution. FIG. 21 illustrates why this typically is so. The graph shows the number of dimensions on the x-axis. The y-axis represents the k-value found to be best on average, when the programs were projected down to the number of dimensions indicated by the x-axis. The best k is determined by the k with the highest BIC score. The y-axis is shown as a percent of the maximum k seen for each program so that the curve can be examined independent of the actual number of clusters found for each program. The results show that for 15 dimensions the number of clusters found begins to stabilize and only climbs slightly.

The advantages of using linear projections are twofold. First, creating new vectors with a low dimension (say, 15) is extremely fast and can even be done at simulation time. Secondly, using a low number (such as 15) dimensions speeds up the k-means algorithm significantly, and reduces the memory requirements by several orders of magnitude over using the original IVs.

FIG. 18 shows the similarity matrix for gcc on the left using original IVs, whereas the similarity matrix on the right shows the same matrix but on the data that has been projected down to 15 dimensions. For the reduced dimension data, the Euclidean distance preferably is used to measure differences, rather than the Manhattan distance used on the full data since the Euclidean distance provides a more accurate representation for data with lower dimensions. After the projection, some information will be blurred, but overall the phases of execution that are very similar with full dimensions can still be seen to have a strong similarity with only 15 dimensions.

Regarding Step 3 above, the k-means algorithm is an iterative optimization algorithm, which executes as two phases, repeated to convergence. The algorithm begins with a random assignment of k different centers, and begins its iterative process. The iterations are required because of the recursive nature of the algorithm. The cluster centers define the cluster membership for each data point, but the data point memberships define the cluster centers. Each point in the data belongs to, and can be considered a member of, a single cluster.

The k cluster centers are initialized by choosing k random points from the data to be clustered. After initialization, the k-means algorithm proceeds in two principal phases that are repeated until convergence:

(a) For each data point being clustered, compare its distance to each of the k cluster centers and assign it to (make it a member of) the cluster to which it is the closest.

(b) For each cluster center, change its position to the centroid of all of the points in its cluster (from the memberships just computed). The centroid is computed as the average of all the data points in the cluster.

This process is iterated until membership (and hence cluster centers) ceases to change between iterations. At this point the algorithm terminates, and the output is a set of final cluster centers and a mapping of each point to the cluster to which it belongs. Since the data is preferably projected down to 15 dimensions, the clusters for k-means can be generated quickly with k from 1 to 10.

There are efficient algorithms for comparing the clusters that are formed for these different values of k, and it is preferred to select one that is good but still uses a small value for k. In an exemplary, nonlimiting example to compare and evaluate the different clusters formed for different k, Bayesian Information Criterion (BIC) is used as a measure of the goodness of fit of a clustering to a dataset. More formally, a BIC score approximates the probability of the clustering given the data that has been clustered. Thus, the larger the BIC score, the higher the probability that the clustering being scored is a good fit to the data being clustered. In an exemplary embodiment, the BIC formulation given in D. Pelleg and A. Moore, "X-means: Extending k-means with efficient estimation of the number of clusters," Proceedings of the 17$^{th}$ International Conf. on Machine Learning," pages 727-734, is used for clustering with k-means, however other formulations of the BIC could also be used.

The BIC score is a penalized likelihood. There are two terms in the BIC: the likelihood and the penalty. The likelihood is a measure of how well the clustering models the data. To determine the likelihood, each cluster is considered to be produced by a spherical Gaussian distribution, and the likelihood of the data in a cluster is the product of the probabilities of each point in the cluster given by the Gaussian distribution. The likelihood for the whole dataset is the product of the likelihoods for all clusters. However, the likelihood tends to increase without bound as more clusters are added. Therefore the second term is a penalty that offsets the likelihood growth based on the number of clusters.

In an exemplary, nonlimiting example, the BIC is formulated as $$BIC(D, k) = l(D \mid k) - \frac{p_j}{2} \log(R)$$

where $l(D|k)$ is the likelihood, R is the number of points in the data, and $p_j$ is the number of parameters to estimate, which is $(k-1)+dk+1$ for $(k-1)$ cluster probabilities, k cluster center estimates that each require d dimensions, and one variance estimate. To compute $l(D|k)$ the equation $$l(D \mid k) = \sum_{i=1}^{k} -\frac{R_i}{2}\log(2\pi) - \frac{R_i d}{2}\log(\sigma^2) - \frac{R_i - 1}{2} + R_i \log(R_i / R)$$

is used, where $R_i$ is the number of points in the $i^{th}$ cluster, and $\sigma^2$ is the average variance of the Euclidean distance from each point to its cluster center.

Figure 22:
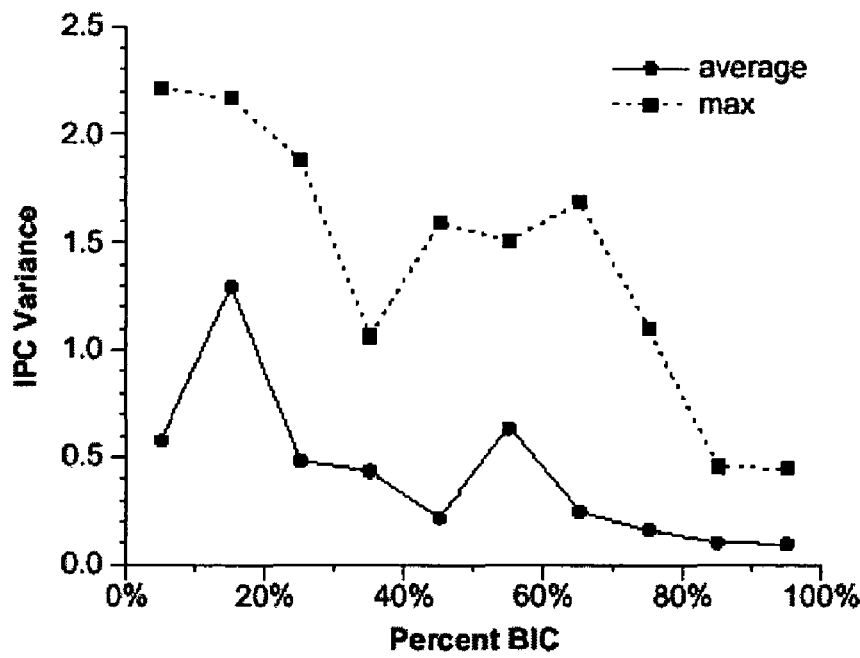
FIG. 22 is a graph plotting average IPC variance and maximum IPC variance versus a percentage according to a Bayesian Information Criterion (BIC) score as used in an embodiment of the present invention.

For a given program and inputs, the BIC score may be calculated for each k-means clustering, for k from 1 to N. Then, the clustering that achieves a BIC score is chosen that is at least a certain percentage, such as 90%, of the spread between the largest and smallest BIC score that the algorithm has seen. FIG. 22 shows the benefit of choosing a BIC with a high value and its relationship with the variance in IPC seen for that cluster. The y-axis shows the percentage of IPC variance seen for a given clustering, and the corresponding BIC score the clustering received. Each point on the graph represents the average or max IPC variance for all points in the range of ±5% of the BIC score shown. The results show that, in the exemplary BIC analysis of FIG. 22, picking clusterings that represent greater than 80% of the BIC score resulted in an IPC variance of less than 20% on average. The IPC variance was computed as the weighted sum of the IPC variance for each cluster, where the weight for a cluster is the number of points in that cluster. The IPC variance for each cluster is simply the variance of the IPC for all the points in that cluster.

In addition to the example above, various other methods for forming clusters, or for assessing or selecting clusterings are possible. In another exemplary non-limiting method, an algorithm may be established so that an operator selects a desired confidence and a probabilistic error bound, and then the smallest clustering k is picked that matches these constraints. Preferably, this algorithm is configured so that candidate clusterings are chosen, first, according to the homogeneity of their clusters based on code usage, and then based upon a confidence and probabilistic error bound. This is because the confidence and error are calculated with respect to CPI and sampling a particular architecture configuration. If a clustering is not chosen based first upon code usage and instead only on confidence and error, then the clustering may not be representative across different hardware configurations.

In an exemplary algorithm, data is clustered for all possible values of k from 1 to max k that is specified by the operator. To ensure that a clustering is picked that would be representative and independent of the underlying architecture we first apply the BIC heuristic to all of the clusterings. Next, the possible set of clusterings is narrowed from k down to B. These B clusterings have a BIC score greater than a specified threshold (for example, 80%). The algorithm then searches this candidate set of B clusterings for the smallest k that meets the desired confidence and error. Picking a subset of clusterings based on BIC and then a final clustering based on variance in this manner ensures that the given set of simulation points chosen will be representative of the complete execution regardless of the underlying architecture.

Figure 17:
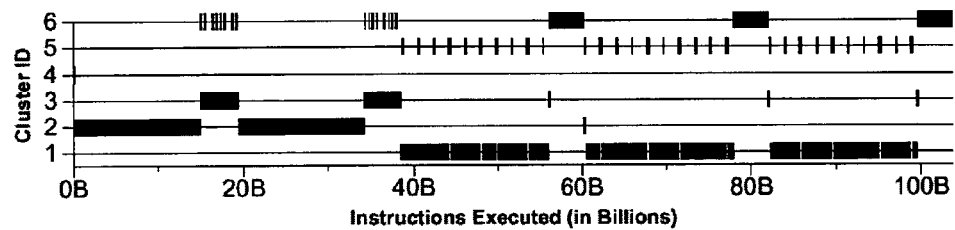
FIG. 17 is a cluster graph for gzip-graphic according to an embodiment of the present invention.
Figure 20:
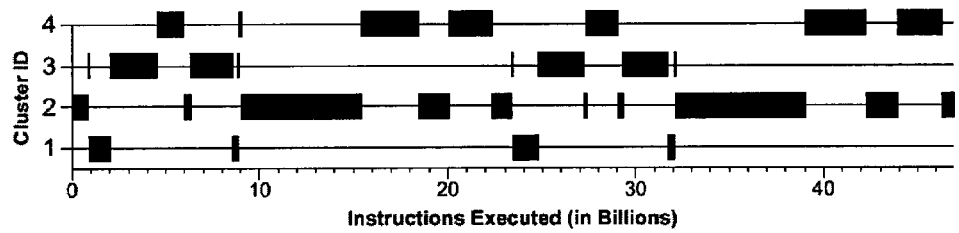
FIG. 20 is a cluster graph for gcc-166 according to an embodiment of the present invention.

FIGS. 17 and 20 show the six clusters formed for gzip and the four clusters formed for gcc. The x-axis corresponds to the execution of the program in billions of instructions, and each interval (each 100 million instructions) is tagged to be in one of the N clusters (labeled on the y-axis). These figures, just as for FIGS. 15 and 18, show the execution of the programs to completion.

For gzip, the full run of the execution is partitioned into a set of six clusters. Looking to FIG. 15 (left) for comparison, it is apparent that the cluster behavior captured by the exemplary algorithm lines up quite closely with the behavior of the program. The majority of the points are contained by clusters 1, 2, 3, and 6. Clusters 1 and 2 represent the large sections of execution that are similar to one another. Clusters 3 and 6 capture the smaller phases that lie in between these large phases, while cluster 5 contains a small subset of the larger phases, and cluster 4 represents the initialization phase.

In the cluster graph for gcc, shown in FIG. 20, the run is now partitioned into four different clusters. Looking to FIG. 18 for comparison, it can be seen that even the more complicated behavior of gcc was captured correctly. Clusters 2 and 4 correspond to the dark boxes shown parallel to the diagonal axis. The projection does introduce some degree of error into the clustering. For example, each of the first group of points in cluster 2 is not that similar to the other points in the cluster. Comparing the two similarity matrices in FIG. 18 shows the introduction of a dark band at (0, 30) on the graph that was not in the original (un-projected) data. Despite these small errors, the clustering is still very good, and the impact of any such errors can be minimized by additional steps, including determining analysis points.

As an example of analysis, modern computer architecture research relies heavily on cycle accurate simulation to help evaluate new architectural features. While the performance of processors continues to grow exponentially, the amount of complexity within a processor continues to grow at an even faster rate. With each generation of processor more transistors are added, and more things are done in parallel on chip in a given cycle, while at the same time cycle times continue to decrease. This growing gap between speed and complexity means that the time to simulate a constant amount of processor time is growing. Thus, executing programs fully to completion in a detailed simulator is typically no longer feasible for architectural studies. Since detailed simulation takes a great deal of processing power, only a small subset of a whole program can be simulated.

For example, SimpleScalar, one of the faster cycle-level simulators, can simulate around 400 million instructions per hour. Unfortunately, many of the new SPEC 2000 programs execute for 300 billion instructions or more. At 400 million instructions per hour this will take approximately 1 month of CPU time.

Because it thus may only be feasible to execute a small portion of the program, it is very important that the section analyzed, for example, simulated, is an accurate representation of the program's behavior as a whole. In another embodiment of the present invention, the behavior identifying and clustering analysis disclosed herein can be employed in combination to select an appropriate section to analyze.

For example, IVs, as described herein, can be used to find a single analysis point automatically to potentially represent the complete execution of a program, by creating a target IV, which is a IV that represents the complete execution of the program. The IV with the lowest Manhattan distance from the target IV represents the single simulation point that executes the code closest to the complete execution of the program. This approach is used to calculate long single analysis points (LongSP).

In an alternative, and preferred, embodiment, the single analysis point can instead be calculated by choosing the IV that has the smallest Euclidean distance from the centroid of the whole dataset in the complete (for example, 15-dimensional) space. The 15-dimensional centroid is formed by taking the average of each dimension over all intervals in the cluster.

Figure 23A:
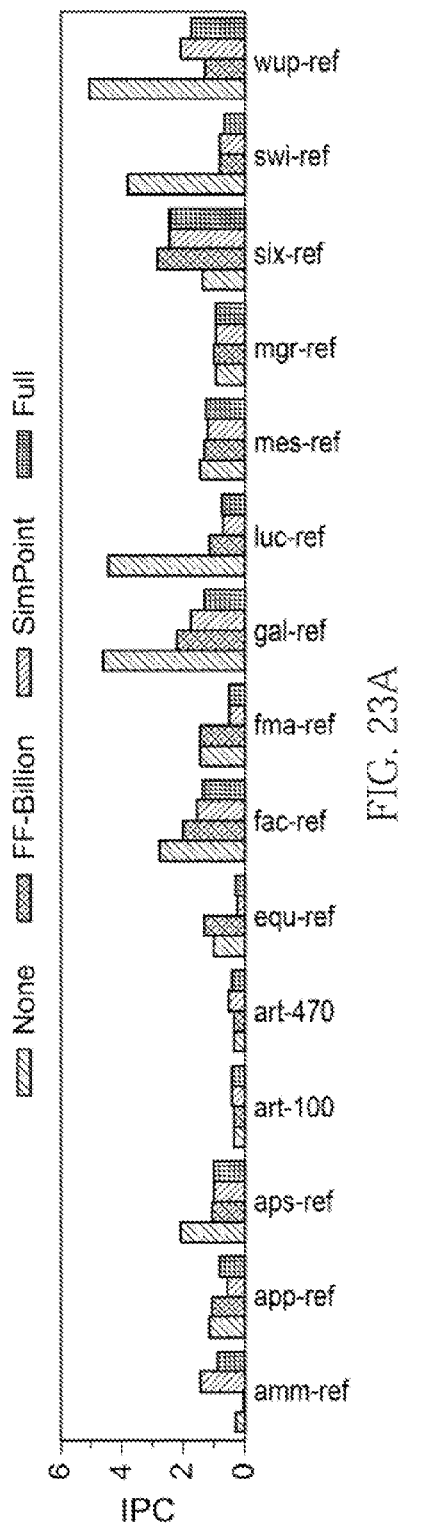
FIGS. 23A and 23B show simulation results starting at the start of a program, after blindly fast-forwarding, using a single analysis point according to an embodiment of the present invention, and the IPC of the full execution of the program, respectively, for a number of SPEC2000 programs.
Figure 23B:
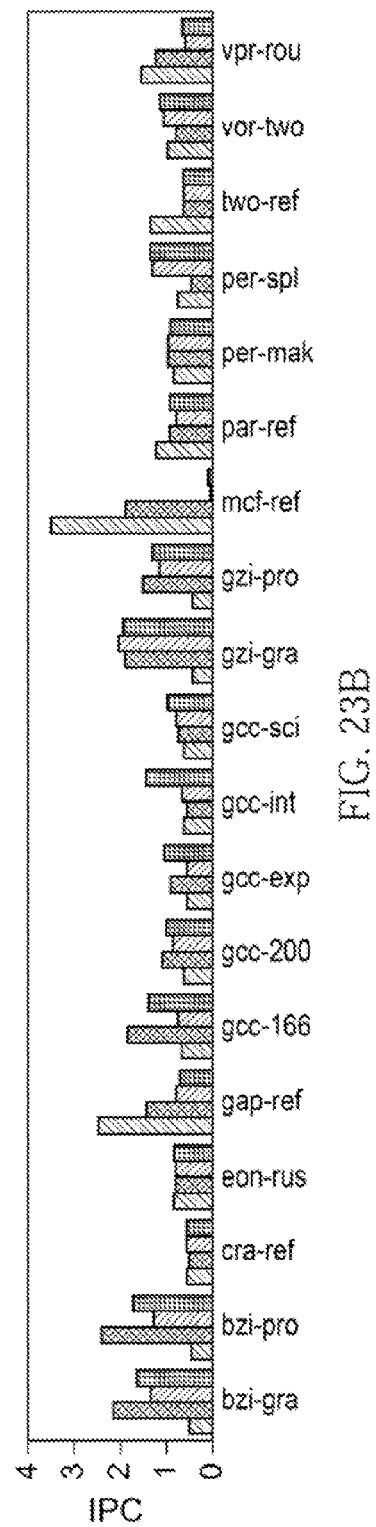

For example, FIG. 23A shows the IPC estimated by executing only a single interval, all 100 million instructions long but chosen by different methods, for all SPEC 2000 programs. By comparison, FIG. 23B shows the IPC found by executing the program to completion. The results are from SimpleScalar using the architecture model described above, and all fast forwarding is done so that all of the architecture structures are completely warmed up when starting simulation (no cold-start effect).

An alternative to fast forwarding is to use check-pointing to start the analysis of a program at a specific point. With check-pointing, code is executed to a given point in the program and the state is saved, or check-pointed, so that other analysis (for example, simulation) runs can start there. In this way the initialization section can be run just one time, and there is no need to fast-forward past it each time. The architectural state (e.g., caches, register file, branch prediction, etc) either can be stored in the trace (if they are not going to change across simulation runs) or can be warmed up.

The first bar, labeled "none", is the IPC found when executing only the first 100 million instructions from the start of execution (without fast forwarding). The second bar, "FF-Billion" shows the results after fast forwarding blindly 1 billion instructions before starting simulation. The third bar, "SimPoint", shows the IPC using the single analysis point analysis of the alternative method described above, and the last bar shows the IPC of simulating the program to completion (labeled "Full"). Because these are actual IPC values, values which are closer to the "Full" bar are better.

The results in FIGS. 23A and 23B show that the determined single analysis points according to this alternative method are very close to the actual full execution of the program, especially when compared against ad hoc techniques. Starting simulation at the start of the program results in an average error of 210%, whereas blindly fast forwarding results in an average 80% IPC error. Using the single analysis point determination method of the alternative embodiment reduces the average IPC error in this example to 18%. These results show that it is possible to capture the behavior of the most programs reasonably, using a very small slice of execution.

FIG. 24 shows the actual analysis points chosen, as well as the program counter (PC) and the procedure name corresponding to the start of the interval. If an input is not attached to the program name, then the default ref input was used.

Columns 2 through 4 are in terms of the number of intervals (each 100 million instructions long). The first column is the number of instructions executed by the program, on the specific input, when run to completion. The second column shows the end of initialization phase calculated. The third column shows the single analysis point automatically chosen according to the alternative embodiment. This analysis point is used to fast-forward to the point of desired execution. Some simulators, debuggers, or tracing environments (e.g., gdb) provide the ability to fast-forward based upon a program PC, and the number of times that PC was executed. In this case, one can provide the instruction PC for the start of the analysis point, the procedure that PC occurred in, and the number of times that PC has to be executed to arrive at the desired analysis point.

These results show that a single analysis point can be accurate for many programs, but there still may be a significant amount of error for particular programs, such as bzip, gzip and gcc. This occurs because there are many different phases of execution in these programs, and a single analysis point will not accurately represent all of the different phases. To address this, another embodiment of the present invention uses the clustering analysis such as that described above to find multiple analysis points, thus capturing the programs' behavior accurately.

To support multiple analysis points for simulation, the simulator can be run from start to stop, only performing detailed simulation on the selected intervals. Alternatively, and preferably, the simulation can be broken down into N simulations, where N is the number of clusters found via clustering analysis, and each simulation is run separately. This has at least the further benefit of breaking the simulation down into parallel components that can be distributed across many processors. For either method, results from the separate analysis points need to be weighed and combined to determine overall performance for the program. Care should be taken to combine statistics correctly (for example, simply averaging may give incorrect results for statistics such as rates).

With clustering analysis to determine multiple analysis points, knowing the clustering alone is not sufficient, because the cluster centers do not correspond to actual intervals of execution. Instead, a representative for each cluster is selected that will be used to approximate the behavior of the full cluster. To select this representative, one chooses, for each cluster, the actual interval that is closest to the center (centroid) of the cluster. In addition to this, any use of this representative is weighted by the size of the cluster it is representing. If a cluster has only one point, for example, its representative will only have a small impact on the overall outcome of the program. Alternatively, an actual interval may be selected that is the earliest (in instructions executed, for example) that is sufficiently representative of a particular cluster. This alternative allows faster simulation time.

FIG. 24 also shows the multiple analysis points found for all of the SPEC 2000 benchmarks using the centroid approach. For these exemplary results, the number of clusters was limited to be at most six for all but the most complex programs. This preferred step was done to limit the number of analysis points, which also limits the amount of warm-up time needed to perform the overall simulation. A preferred cluster formation algorithm takes as an input parameter the maximum number of clusters to be allowed.

Each analysis point contains two numbers. The first number is the location of the analysis point in, for example, hundreds of millions of instructions. The second number in parentheses is the weight for that analysis point, which is used to create an overall combined metric. Each analysis point in this example corresponds to 100 million instructions.

FIGS. 25A-25B show the IPC results for multiple analysis points. The first bar shows exemplary single analysis points simulating for 100 million instructions. The second bar, "LongSP", chooses a single analysis point for simulation, but the length of simulation is identical to the length used for multiple analysis points (which may go up to, for example, 1 billion instructions). This is to provide a fair comparison between the single analysis points and multiple. The "Multiple" bar shows results using the multiple analysis points, and the final bar is IPC for full simulation. As in FIGS. 23A-23B, the closer the bar is to "Full", the better.

The results show that the average IPC error rate is reduced to 3% using multiple analysis points, which is down from 17% using the long single analysis point. This is significantly lower than the average 80% error seen for blindly fast forwarding. The benefits can be most clearly seen in the programs bzip, gcc, ammp, and galgel. The reason that the long contiguous simulation points do not do much better is that they are constrained to only sample at one place in the program. For many programs this is sufficient, but for those with interesting long term behavior, such as bzip, it may be difficult or impossible to approximate the full behavior.

Figure 26A:
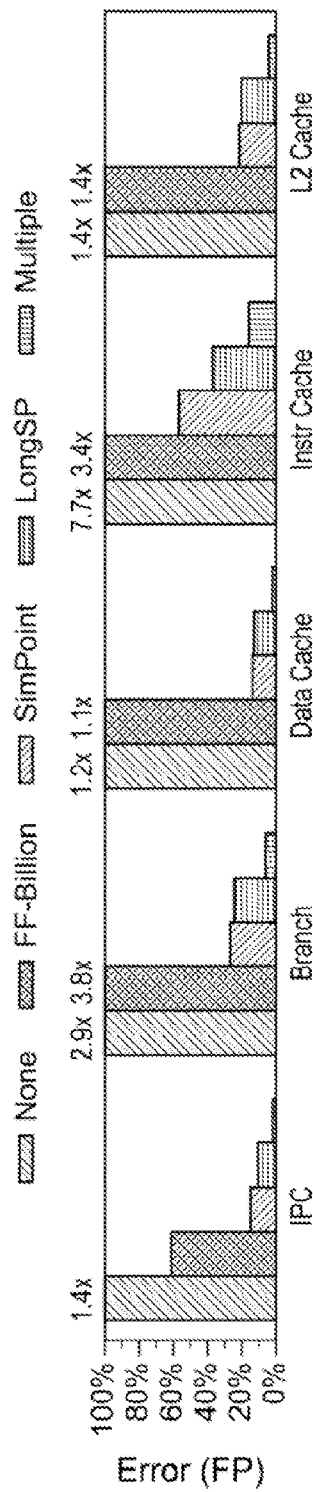
FIGS. 26A-26B are graphs showing average error results for SPEC floating point and integer benchmarks, respectively, for IPC, branch misprediction, instruction, data, and unified L2 cache miss rates, taken at various points, including analysis points determined according to an embodiment of the present method.
Figure 26B:
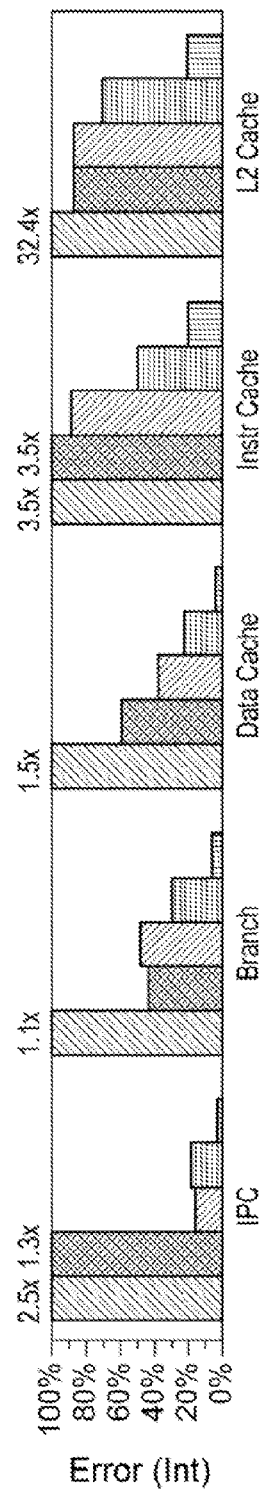

FIGS. 26A-26B show the average over all of the floating point programs (FIG. 26A) and integer programs (FIG. 26B). Errors for IPC, branch miss rate, instruction and data cache miss rates, and the unified L2 cache miss rate for the architecture in FIG. 14 are shown. The errors are with respect to these metrics for the full length of simulation using SimpleScalar. Results are shown for starting simulation at the start of the program ("None"), blindly fast forwarding a billion instructions ("FF-Billion"), single simulation points of duration 1 ("SimPoint") and k ("LongSP"), and multiple simulation points ("Multiple").

It can be seen that using a single small analysis point performs quite well on average across all of the metrics when compared to blindly fast-forwarding. However, better results are derived from using the clustering analysis across all of the metrics examined.

It is notable that the error rate of the instruction cache and L2 cache appear to be high (especially for the integer programs) despite the fact that the results are quite good in terms of overall performance. This is because FIGS. 26A-26B present an arithmetic mean of the errors, and several programs have high error rates due to the very small number of cache misses. If there are 10 misses in the whole program, and 100 are estimated, that will result in an error of 10×. The overall IPC is preferably used as the most important metric for evaluation as it implicitly weighs each of the metrics by its relative importance.

Automatically identifying the phase behavior using clustering is beneficial for architecture, compiler, and operating system optimizations. In another embodiment of the present invention, an efficient technique is provided for identifying phases, preferably on-the-fly. In an exemplary embodiment, IVs and a reducing method such as random projection are used. This technique can be efficiently implemented in hardware or software. Besides identifying phases, this approach preferably can predict not only when a phase change is about to occur, but to which phase it is about to transition. Using phase information can lead to new compiler optimizations with code tailored to different phases of execution, multi-threaded architecture scheduling, power management, and other resource distribution problems controlled by software, hardware or the operating system.

A preferred phase tracking and prediction architecture is based on run-length encoding of past phase information, and creates a history based on both phase pattern and duration. If the predictions are generic (i.e. not based on a specific hardware metric) phase identifiers, this information can still be used to make predictions about the future of other metrics such as, but not limited to, power and performance.

The preferred phase tracking architecture and phase prediction architecture is based upon the code that is executed, and it is independent of the different hardware metrics, but can be used to identify changes in execution. However, other metrics, including hardware metrics, may be used. The phase prediction architecture compresses a history of phases and uses this history to predict the next phase to occur. The phases of a program are accurately classified using the preferred generic phase tracker architecture across several metrics including, but not limited to, IPC, energy, I-cache and D-cache miss rates, and branch misprediction rates.

An exemplary embodiment provides, among other features, a preferably efficient run-time phase tracking architecture that is based on detecting changes in portions of code that are executed. This exemplary implementation is independent of any individual metric, which allows the preferred phase tracking architecture to be used as a general technique for correlating program behavior with any code that is executed. The preferred phase tracking mechanism can, along with an identification mechanism, partition behavior of a program into homogeneous sections of execution automatically.

An embodiment of the present invention provides a generic fast run-time algorithm for classifying phases and identifying phase changes, which relies only on dynamic code profile information. A preferred phase-based tracker can then be used for tracking phase behavior for many different types of hardware metrics. This preferred embodiment can also be used to predict phase changes and the expected metrics and performance for those phase changes.

Depending upon the accuracy desired, a preferred method can analyze a program with only a small slowdown over the original program's execution. In comparison, performing this same analysis for a specific hardware, operating system, or runtime metric can slow down the system being monitored by, for example, thousands of times.

By providing a generic approach to analysis, the similarity and phases found can be used to represent similarity and phases found for executing that same program in terms of metrics such as hardware, operating system, or runtime metrics. As an example, similarity and phase-based analysis performed at the code level can accurately find similarity and phase-based behavior for the hardware metrics the software is being run upon (such as IPC, cache miss rates, power usage, frequency of JIT operations), software behavior (for example, size and frequency of memory allocations, call stack depth), operating system behavior (for example, number of page faults, context switches), and potentially other types of behavior.

For example, a combination of the program structure and runtime or simulation-based analysis can find phase-based behavior quickly. This can be accomplished at the procedure level, basic block level, branch level, or by examining groups of instruction PC's executed close to each other in time.

This exemplary method and architecture also permits using the similarity and phase-based behavior found via program structure for analysis or optimization of software, hardware, operating system, or runtime system that in conventional work requires metric-specific analysis. As a result, generic, program level analysis can be performed in a fraction of time as compared to metric-specific analysis.

According to a preferred embodiment, a hardware architecture is provided for predicting program phases. A preferred aspect provides an efficient and general purpose technique for capturing and predicting the run-time phase behavior of programs to help guide optimization seeking to exploit large-scale program behavior.

A preferred hardware phase classifier is also provided, which may be used for, among other things: voltage scaling; gating hardware structure usage; orchestrating multithreaded execution; guiding software policy in threaded architectures; and monitoring program behavior for further dynamic optimization.

In an exemplary phase tracking and classification method, information was collected for ten SPEC 2000 programs: applu, apsi, art, bzip, facerec, galgel, gcc, gzip, mcf, and vpr, all with reference inputs. All programs were executed from start all the way through to completion using SimpleScalar and Wattch. These programs were chosen because their phase-based behavior represents a reasonable snapshot of the SPEC 2000 benchmark suite, and these programs showed interesting phase-based behavior. Each program was compiled on a DEC Alpha AX P-21164 processor using the DEC C and FORTRAN compilers. The programs were built under OSF/1 V4.0 operating system using full compiler optimization (-04-ifo).

The timing simulator used is derived from the SimpleScalar 3.0 tool set, a suite a functional and timing simulation tools for the Alpha AXP ISA. The baseline microarchitecture model was as follows: instruction cache—16 k 4-way set-associative, 32 byte blocks, 1 cycle latency; data cache—16 k 4-way set-associative, 32 byte blocks, 1 cycle latency; unified L2 cache—128K 8-way set-associative, 64 byte blocks, 12 cycle latency; main memory—120 latency; branch predictor—hybrid, 8-bit gshare with 2 k 2-bit predictors+a 8 k bimodal predictor; out-of-order issue—out-of-order issue of up to 4 operations per cycle, 64 entry re-order buffer; mechanism—load/store queue, loads may execute when all prior store addresses are known; architecture registers—32 integer, 32 floating point; functional units—2-integer ALU, 2-load/store units, 1-FP adder, 1-integer MULT/DIV, 1-FP MULT/DIV; virtual memory—8K byte pages, 30 cycle fixed TLB miss latency after earlier-issued instructions complete.

In addition to this, it was desired to examine energy usage results, so a version of Wattch was used to capture that information. All of these tools were modified to log and reset the statistics every 10 million instructions, and this was used as a base for evaluation. A ten million instruction interval was selected, as this interval is outside of the scope of normal architectural timing, yet it is small enough to allow many complex phase behaviors to be seen.

Figure 27A:
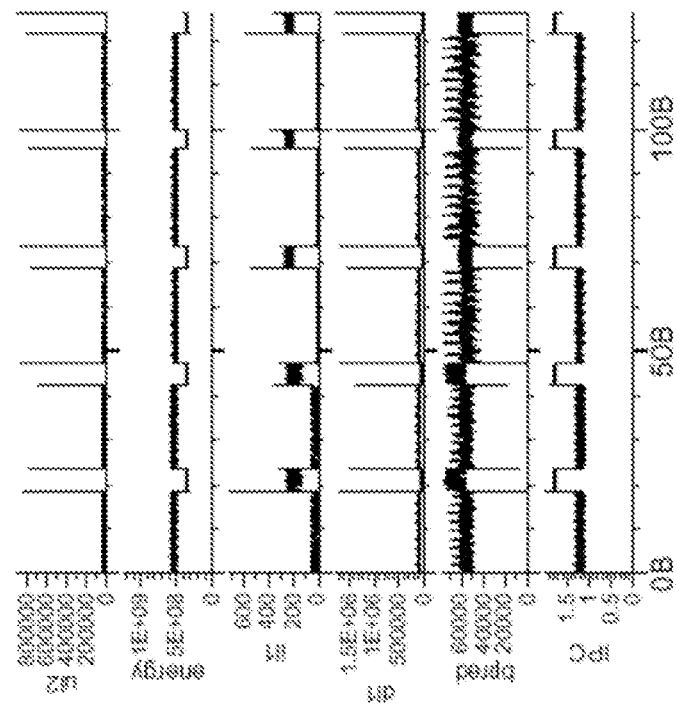
FIGS. 27A and 27B are graphs showing behavior of programs gcc and gzip over the course of their execution.
Figure 27B:
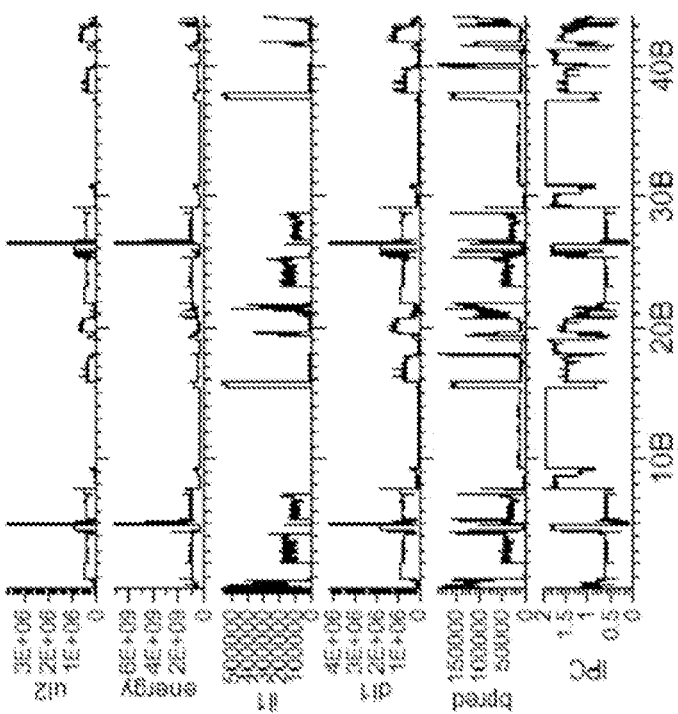

FIGS. 27A and 27B illustrate a reason for this approach. These graphs show behavior of two programs, gcc and gzip, as measured by various statistics over their execution. The runs for gcc and gzip are shown from start to finish, over billions of instructions. Each point on the graph is taken over ten million instructions worth of execution. The metrics shown are: the number of unified L2 cache misses (ul2); the energy consumed by the execution of the instructions; the number of instruction cache misses (il1); the number of data cache misses (dl1); the number of branch mispredictions (bpred) and the average IPC. The results show that all of the metrics change in unison, but not necessarily in the same direction. In addition, patterns can be seen in the execution of these programs on a very large time scale.

A preferred phase tracking method and architecture operates at two different time scales: it gathers profile information very quickly to keep up with processor speeds, while at the same time it compares any data it gathers with information collected over the long term. Preferably, it performs these functions though having a small size.

Figure 28:
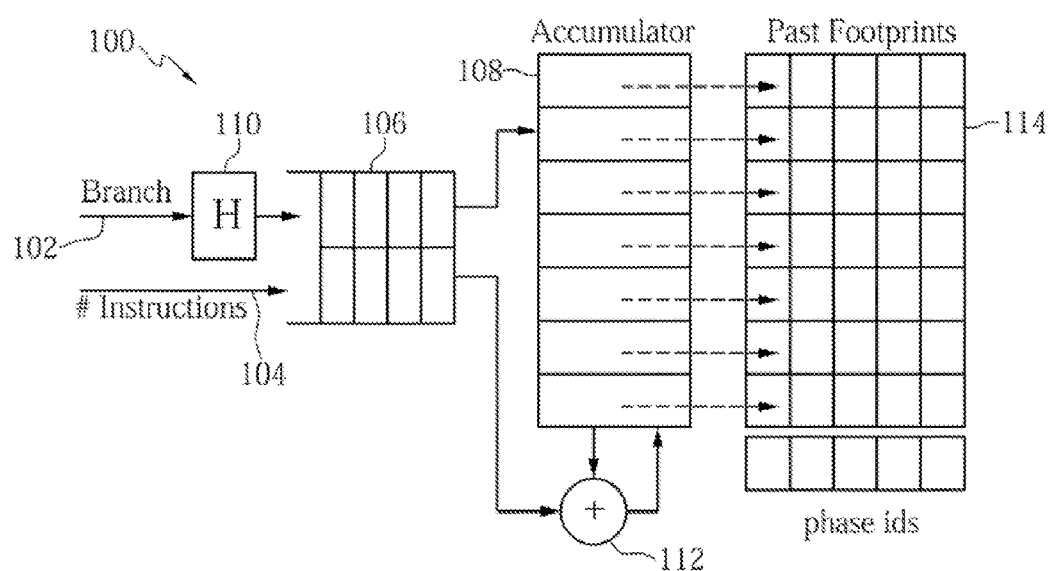
FIG. 28 shows an exemplary phase classification architecture according to a preferred embodiment of the present invention.

A preferred phase tracking architecture 100 is shown in FIG. 28. A goal of the preferred phase tracking architecture 100 is to capture basic block information during execution, while not relying on any compiler support. Program components, such as basic blocks that are larger need to be weighed more heavily, as they account for a more significant portion of the execution. To approximate the capture of program component information, branch PC's 102 are captured, along with the number of instructions 104 executed between branches. The architecture 100 receives an input that is a tuple of information, a branch ID (PC) and the number of instructions since the last branch PC was executed. This allows each program component that is executed to be roughly captured, along with the weight of the program component in terms of the number of instructions executed, for identifying analysis points.

By examining only the executed code, the preferred phase tracking architecture 100 is independent of any individual architecture metric. This allows the phase tracking architecture 100 to be used as a general profiling technique building up a profile or database of architecture information on a per phase basis to be used later for hardware or software implementation. This independence also allows the phase tracking architecture 100 to track phase information consistently as the program's behavior changes due to phase-based optimizations.

Another advantage of tracking the proportions in which the basic blocks are executed is that this information can be used to identify not only when different sections of code are executing, but also when those sections of code are being exercised differently. A simple example is in a graphics manipulation program running a parameterized filter on an input image. If a simple 3×3 blur filter is run on an image, different behavior is obtained versus running a 7×7 filter on the same image, despite the fact that the same filter code is executing. The 7×7 filter will have many more memory references, and those memory references conflict very differently in the cache than in the 3×3 case. Using the proportion of execution for each basic block can distinguish these differences, because in the 3×3 filter the head of the loop is called more than twice as frequently as in the 7×7 filter.

The same general idea applies to other data structures as well. Take, for example, a linked list. As the number of nodes in the linked list traversal changes over different loop invocations, the number of instructions executed inside the loop versus the time spent outside the loop also changes. This behavior can be captured when including a measure of the proportion of the code executed, and this can distinguish between link list traversals of different lengths.

An accumulator table 108 receives the information. To index into the accumulator table 108 in FIG. 28, the branch ID is then reduced to a number of buckets 106 between 1 and N using a hash function 110. If too few buckets 106 are used, aliasing effects can occur, where two different phases will appear to have very similar signatures. For example, thirty-two buckets has been found to be sufficient to distinguish between all of the different phases for even some of the more complex programs, such as gcc. Fewer or greater numbers of the buckets 106 may be used as well, depending on the desired results and resources. A counter 112 is kept for each of the buckets 106, and the counter is incremented by the number of instructions from the last branch to the current branch being processed. Each entry to the accumulator table 108 is a large (for example, 24-bit) saturating counter, which will most likely not saturate during the profiling interval (here, ten million instructions). Updating the accumulator table 108 is preferably the only operation that needs to be performed at a rate that is equivalent to the processor's execution of the program. In comparison, the preferred phase classification program needs only to be performed at the end of each interval (e.g. every ten million instructions), and thus is not nearly as performance critical.

A preferred hash function 110 used for the phase classification architecture 100 is a random projection. This random projection takes trace data in the form of a matrix of size L×B, where L is the length of the trace and B is the number of unique basic blocks, and multiplies it by a random matrix of size B×N, where N is the desired dimensionality of the data, and is much smaller than B. This hashing scheme is essentially a degenerate form of random projection that makes a hardware implementation feasible while still having low error.

If a random projection matrix is chosen such that all of the elements of the matrix are either 0 or 1, and it is chosen such that no column of the matrix contains more than a single 1, then the random projection is identical to this simple hashing mechanism. Put another way, the random projection can be thought of as a generated random bit mask that filters all but one of the buckets at each step of the hashing operation. The preferred hashing function of the phase capture mechanism has been designed around this principle.

Figure 29:
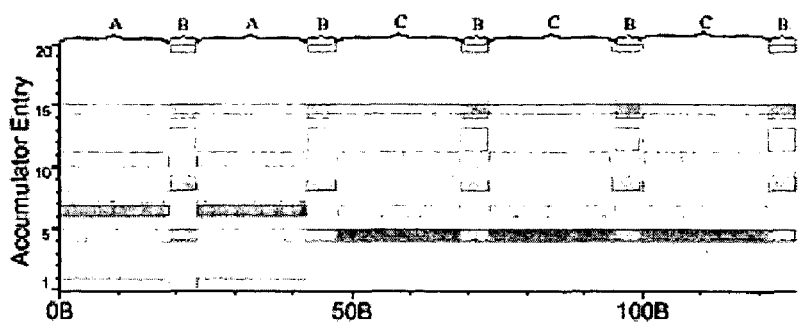
FIG. 29 is a graph showing accumulator table entries tracking program behavior for program gzip in an example run of the present method.

FIG. 29 shows an effect of tracking the behavior of programs using the preferred phase tracking architecture 100 of the present invention, to track program behavior on the program gzip. The x-axis of FIG. 29 is in billions of instructions, as in FIGS. 27A and 27B. Each point on the y-axis represents an entry of the preferred phase tracking architecture's accumulator table, and each point on the graph corresponds to the value of the corresponding accumulator table entry at the end of a profiling interval. Dark values represent high execution frequency, while light values correspond to less.

The same trends that were seen in FIGS. 27A and 27B for gzip can be clearly seen in FIG. 29. In both of these figures, it can be seen at the highest level of granularity that there are at least three different phases labeled A, B, and C. As shown in FIG. 29, the phase tracking table entries 2, 5, 7, 13, and 17 distinguish the two identical long running phases labeled A from a group of three long-running phases labeled C. Phase table entries 12 and 20 clearly distinguish phase B from both A and C. This pictorially shows that the preferred phase tracker is able to break the program's execution into the corresponding phases based solely on the executed code, and these phases correspond to the behavior seen across the different program metrics shown in FIGS. 27A and 27B.

After the profiling interval has elapsed, and branch block information is accumulated in the table 108, the phase is then classified. To do this, a history of past phase information is retained.

If the number of instructions is fixed for a profiling interval, then by dividing each bucket by this fixed number, a percentage of execution that was accounted for all instructions mapped to the bucket can be obtained. Preferably, instead of keeping the full counter values, phase information is compressed down to a small number (as a non-limiting example, two or three) of the most significant bits. This compressed information is then kept in the Past Signature table 114, as shown in FIG. 28.

The number of bits of information retained for analysis is related to the number of the buckets 106, which is N. As the number of the buckets 106 is increased, the data is spread over more buckets (table entries), making for less entries per bucket (better resolution), but at the cost of more area (both in terms of number of buckets and more bits per bucket). Preferably, any distribution into the buckets 106 should provide useful information. To accomplish this, it is necessary to insure that, even if data is distributed perfectly evenly over all of the buckets 106, information is recorded about the frequency of those buckets. This can be achieved, for example, by reducing the accumulator counter by:

(bucket[i]×Nbuckets/intervalsize)

If the number of the buckets 106 and interval size are powers of two, this indicates a simple shift operation. For the number of buckets 106 selected in the example given (thirty-two), and the interval size profiled, this reduces the bucket size down to six bits, and preferably requires twenty-four bytes of storage for each unique phase in the Past Signature table of FIG. 28. Typically, the top six bits of the counter 112 are more than enough to distinguish between two phases, however it is possible that one or two additional bits, for example, may be needed to reduce quantization error.

Figure 30:
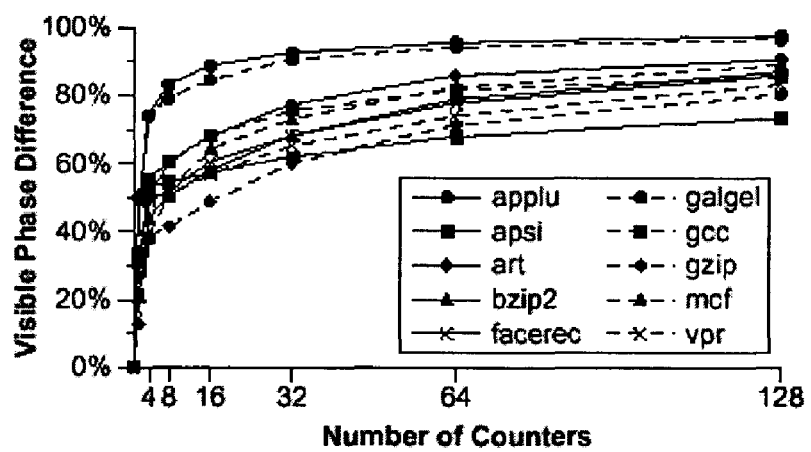
FIG. 30 is a graph comparing percentage of visible phase difference between signatures representing sequential levels of execution to the number of counters representing the signatures, according to an embodiment of the present method.

To examine the aliasing effect described above, and to determine what an appropriate number of buckets 106 should be, FIG. 30 shows the sum of the differences in the bucket weights found between all sequential intervals of execution. The y-axis shows the sum total of differences for each program. This is calculated by summing the differences between the buckets 106 captured for interval i and i−1 for each interval i in the program. The x-axis is the number of distinct buckets used. All of the results are compared to the ideal case of using an infinite number of buckets (or one for each separate basic block) to create the signature. On the program gcc, for example, the total sum of differences with 32 buckets was 72% of that captured with an infinite number of buckets. In general, 32 buckets has been found to be enough to distinguish between two phases.

After the vector is reduced to form a signature, the classification process begins by comparing the vector to a set of representative past signature vectors. According to a preferred method of the present invention, for each vector in the Past Signature table 114 starting with the oldest, the current vector is compared to that vector. If a match exists, the profiled section of execution is classified into the same phase as the past signature vector, and the current vector is not inserted into the Past Signature table 114.

If there is no match, then a new phase has been found, and a new phase ID is created into which the new phase is classified. Preferably, this is done by choosing a unique phase ID from a fixed pool of a maximum number of ID's. A new Past Signature table 114 entry is allocated and set to the current vector, and the newly allocated phase ID is stored with that entry. This allows future similar phases to be classified with the same ID. In this way, only a single vector is kept for each unique phase ID, to serve as a representative of that phase. After a phase ID is provided for the most recent interval, it is passed along to prediction and statistic logging, and the phase identification step is completed.

Figure 31:
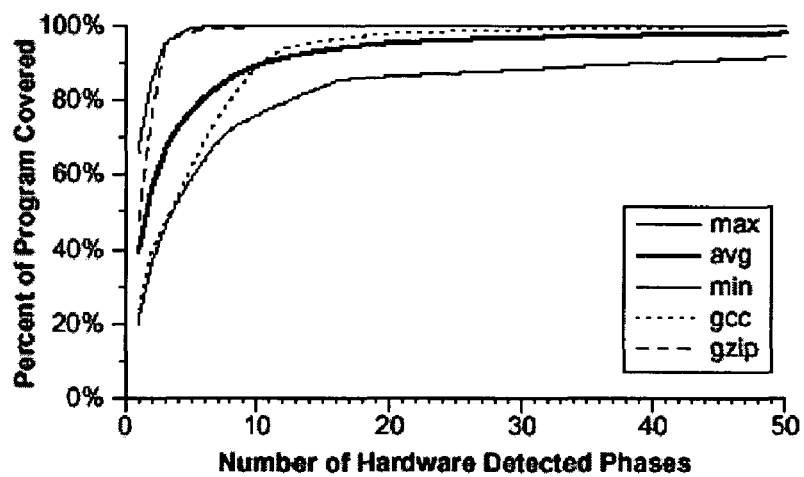
FIG. 31 is a graph comparing a minimum number of phases determined using an embodiment of the present method to the amount of program execution covered by the phases.

To examine the number of phase ID's to track, FIG. 31 shows the percentage of execution accounted for by the top p phases on the y-axis, where p is shown on the x-axis. Results are graphed for the programs that had the minimum (galgel) and maximum (art) coverage, gcc, gzip, and the overall average. The results show that most of the program's behavior can be captured using relatively few phases.

If only the top twenty phases are used to track and optimize, in the example shown, one can capture and be able to accurately apply phase prediction/optimizations to over 90% of the programs' execution on average. In the worst case shown (min), most of the program (over 80%) can be optimized by targeting a small number (twenty) of important recurring phases.

A preferred method for finding a match will now be described. As described above, the history in the Past Signature table 114 is searched to find a match. This search, however, is complicated somewhat by the fact that the searched-for match is not necessarily an exact match. For example, two sections of execution that have very close signatures can be considered a match, even if they do not compare exactly. Thus, to compare two vectors to one another, a preferred embodiment of the present method uses the Manhattan distance between the two vectors as described above.

If a threshold is set too low, the phase detection will be overly sensitive, and will classify the program into a large number of comparatively tiny phases. This may substantially reduce, or even eliminate, the benefit from performing run-time analysis. However, if the threshold is set too high, the phase classification may not be able to distinguish between phases with different behavior. To quantify the effect the threshold choice has on the overall effectiveness of the phase detection, it is examined how well the preferred method classifies phases for a variety of thresholds compared to the exemplary clustering algorithm described above, which may be run off-line, for example.

The clustering method preferably is able to make global decisions to optimize the grouping of similar intervals into phases. The clustering preferably makes no use of thresholds, but instead its decisions are preferably based solely on the structure found in the distribution of program behaviors. A preferred run-time phase tracking method and architecture, on the other hand, should be performed on-line and with limited computational overhead. This reduction in clarity comes at the cost of increased error.

Figure 32:
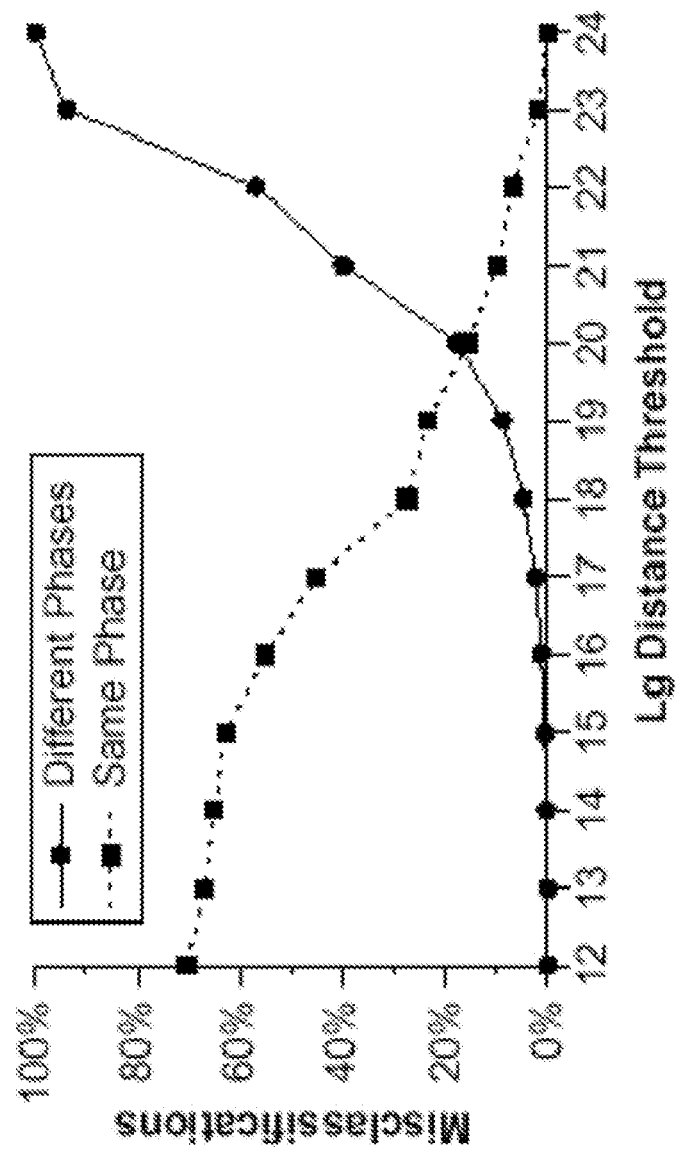
FIG. 32 is a graph comparing misclassifications of phases found in a runtime embodiment of the present invention to a comparison threshold determined using an offline embodiment of the present invention.

FIG. 32 shows a measured ability of an exemplary run-time method to find phase changes (transitions between one phase and the next) when different thresholds are used to perform the phase classification. For example, using a Manhattan distance of 1 million as a threshold (shown as 20 on the x-axis because it is in $\log_2$), as shown on the Different Phases line, the exemplary hardware technique identified 80% of the phase changes that occurred as discovered via the clustering analysis of the present invention. Conversely, 20% of the phases were incorrectly classified as having the same phase ID as the last interval of execution.

Likewise, the Same Phases line represents the ability of the run-time method and architecture to accurately classify two sequential intervals as being part of the same phase as a function of different thresholds, again as compared to the clustering method. For example, when using a Manhattan distance of 1 million, the run-time method identified 80% of the intervals that stayed in the same phase as correctly staying in the same phase, but 20% of those intervals were classified as having a different phase ID from the prior phase.

A misclassification occurs when two sequential intervals of execution are classified as being in the same phase or in different phases when the clustering analysis found an opposite result as the run-time method. If, on the other hand, the method is too aggressive so that phase changes are indicated that do not exist, too many phase ID's having similar behavior will be created. This will create more overhead for performing phase-based optimization. If the approach is too passive, opportunities will be missed to make phase-specific optimizations. To strike a balance, an exemplary embodiment uses a threshold Manhattan distance of 1 million.

Phase classification can thus be performed on the programs at run-time, preferably with little to no impact on the design of the processor core. The phase classification step divides the programs into sets of phases that are fairly homogeneous. This means that an optimization adapted to and applied to a single segment of execution that is taken from that phase will apply equally well to the other parts of the phase. To quantify the extent to which this goal has been achieved, statistics are examined on a per-phase basis, and the homogeneity of the statistics from each phase is examined.

FIG. 33 shows the results of performing this analysis on the phases for programs gcc and gzip as determined at run-time. For each program, a set of statistics and their values for each phase are shown. The first phase listed (separated from the rest) is "full", which is the result if the entire program is classified into a single phase. The results show that for gcc, for example, the average IPC of the entire program was 1.32, while the average number of cache misses was 445,083 per ten million instructions. In addition to the average value, the standard deviation is shown for a particular statistic. For example, while the average IPC was 1.32 for gcc, it varied with a standard deviation of over 43% from interval to interval. If the phases are classified well, the standard deviations should be relatively low for a given phase ID.

In FIG. 33, the top five most frequently executed phases from the program as identified by the run-time phase tracking architecture are shown underneath the phase marked "full". The phases are weighted by how much of the program's executed instructions they account for. For gcc, for example, the largest phase accounts for 18.5% of the instructions in the entire program and has an average IPC of 0.61 and a standard deviation of only 1.6% (of 0.61). The other top four phases have standard deviations at or below this level, which means that the technique was successful at dividing up the execution of gcc into large phases with similar execution behavior with respect to IPC.

Some metrics for certain phases have a high standard deviation, but this occurs for architecture features or metrics that are unimportant from that phase. For example, the phase that occurs for 7.2% of execution in gcc has only 75 L1 instruction cache misses on average. This is an L1 miss rate of 0.00075%, so an error of 215% for this metric will not likely have any effect on the phase. Thus, despite this exaggeration of small error in rarely occurring events, it is preferred that standard deviation be used to assess the effectiveness of the run-time phase tracking architecture 100.

By looking at energy consumption of gcc, it is apparent that energy consumption swings substantially (a standard deviation of 90%). This can also be seen in FIGS. 27A and 27B, which plot the energy usage versus instructions executed. However, after dividing the executed program into phases, it can be seen that each phase has a very small variation within itself, in that all have standard deviation less than 2%. It can also be seen by examining gcc that the phase partitioning does a very good job across all of the measured statistics, even though a single classification is made and used for all metrics. This indicates that the phases detected by the run-time phase detection architecture 100 are in some way representative of the actual behavior of the program.

After the phase tracking step, the determined phase information may preferably be used to predict the next phase to occur. It is important for a variety of applications to be able to predict future phase changes so that the system can configure itself for the code it is now executing, rather than simply reacting to a change in behavior.

Figure 34:
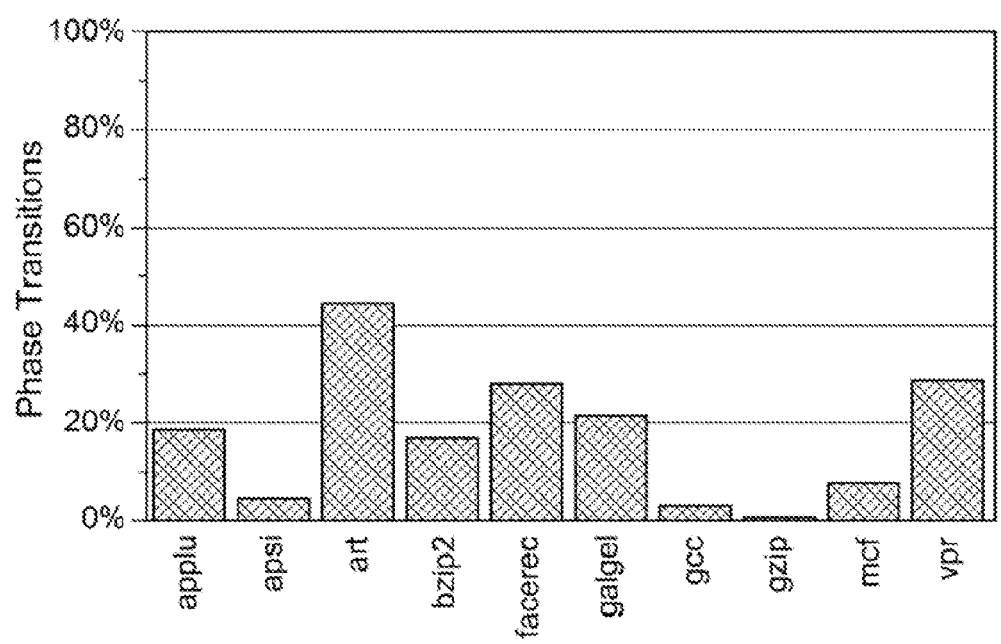
FIG. 34 is a graph comparing percentage of execution intervals that transition to a different phase for programs, according to an exemplary method.

FIG. 34 shows the percentage of interval transitions that are changes in phase, for the exemplary set of benchmarks. For all of these programs, phase changes occur quite often, but this statistic alone does not gauge the complexity of the program behavior. The program gcc, for example, switches less than 10% of the time, but switches between many different phases. The other extreme is art, which switches almost half the time, but it is only switching between a few distinct phases. In this case, one obtains large repeating patterns, where no two phases executing sequentially are that similar, but there is a larger order to the sequence. By adding in a prediction scheme for these cases, one cannot only take advantage of stable conditions as in past research, but also actually take advantage of any repeating patterns in program behavior.

A method and architecture for prediction of phase behavior in programs will now be described. After observing the way that phases change in the exemplary set of applications, it was determined that at least two things are significant. First, the set of phases leading up to the prediction is very important, and second, the duration of execution of those phases is important.

A preferred prediction model that is straightforward to implement in hardware is a Markov Model. Markov Models have been used in computer architecture to predict prefetch addresses and branches. The basic idea behind a Markov Model is that the next state of the system is related to the last N past states.

The theory behind this preferred prediction model is that phase information tends to be characterized by many sections of stable behavior interspersed with abrupt phase changes. The key is to be able to predict when these phase changes will occur, and to know ahead of time to which phase they will change. The problem is that the changes are often preceded by stable conditions, and if only the last couple of intervals, for example, are considered, it may be difficult or impossible to tell the difference between sections of stable behavior that precede a phase change, and those sections that will continue to be stable. Instead, a way of compressing down stable phase information into a piece of information that can be used as a state is desired.

Figure 35:
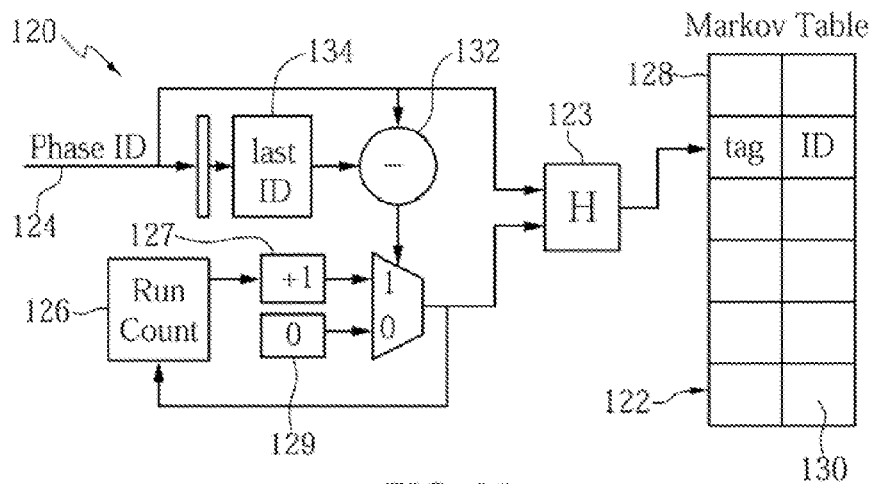
FIG. 35 shows an exemplary phase prediction architecture according to an embodiment of the present invention.

FIG. 35 shows a preferred prediction architecture 120, which is a run-length encoding (RLE) Markov predictor. The RLE Markov predictor uses a run-length encoded version of the history to index into a prediction table 122. The index into the prediction table is (1) a hash 123 including of the phase identifier 124 that was just seen and (2) the number of times that phase ID has occurred in a row according to a run count 126, which is incremented at 127 or reset at 129.

As shown in FIG. 35, in a preferred RLE Markov predictor, the lower order bits of the hash function provide an index 128 into the prediction table 122, and the higher order bits of the hash function provide a tag 130. When there is a tag match 132 from the last ID 134, the phase ID stored in the table 130 provides a prediction as to the next phase to occur in execution. When there is a tag miss, the prior phase ID 134 is assumed the next phase ID to occur in the program's execution. It has been found that predicting the last phase ID is about 75% accurate on average.

The predictor preferably is only updated when there is (1) a change in the phase ID, or (2) when there is a tag match. An entry to the table 122 is only inserted when there is a phase ID change, since it is desired to predict when the phase is going to change. Execution intervals where the same phase ID occurs several times in a row do not need to be stored in the table 122, since they will be correctly predicted as "last phase ID", when there is a table miss. This helps table capacity constraints and avoids polluting the table with last phase predictions. For the second update case, when there is a tag match, the predictor is updated because the observed run length may have potentially changed. It is contemplated that the prediction table can be further optimized by introducing (adding) hysteresis to the table to prevent noise from affecting the result too strongly.

Figure 36:
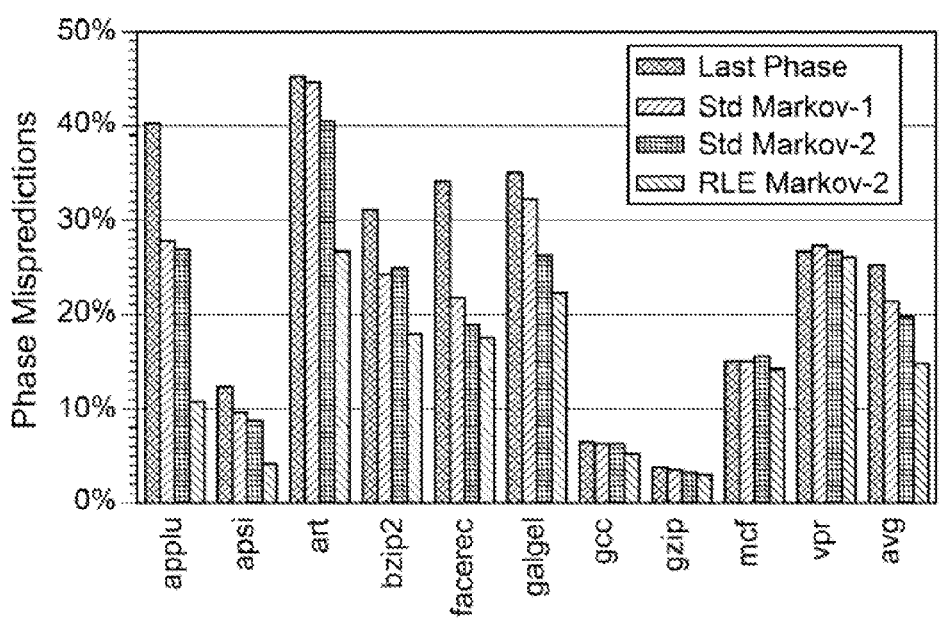
FIG. 36 is a table illustrating phase prediction accuracy for various prediction schemes.

The preferred phase prediction method is compared with other prediction schemes in FIG. 36. FIG. 36 has four bars for every program, with each bar corresponding to the prediction accuracy of a prediction scheme. The first and simplest scheme, "Last Phase", simply predicts that the phase ID that will occur next is the same as the one that has just been observed, in essence always predicting stable operation. The prediction accuracy of this scheme is inversely proportional to the rate at which phases change in a given benchmark. For the program gzip for example, there long periods of execution where the phase does not change, and therefore predicting no-change does exceptionally well.

In order to consider the effect of noise, the preferred phase predictor was compared to a simple noise filter, which works by predicting that the next phase will be the most commonly occurring of the last three phases seen. This is not shown, as the simple noise filter performed worse on all of the programs.

Additionally, the effect of a simple Markov predictor was considered for history lengths of 1 and 2. The simple Markov model predictor does a better job of predicting phase transitions than "Last Phase", but it is limited by the fact that long runs will always be predicted as infinitely stable due to the history filling up. However, it still very effective for facerec and applu, but does not provide much benefit for either art or galgel.

The final bar, RLE Markov, is a preferred predictor of the present invention, which is capable of compressing multiple periods in a particular phase into a tuple of phase ID and duration. All of the Markov predictors simulated in this example had 256 entries taking up less than 500 bytes of storage. The preferred RLE Markov predictor outperformed the other benchmarks tested.

Use of the novel prediction and classification method and architecture may be suitable for applications such as, but not limited to, multi-threaded architecture scheduling, power management, and other resource problems that must be controlled by the operating system but have effects on the microarchitectural level.

The program analysis of the present invention is applicable to various applications. As a nonlimiting example, the inventive methods may be used to aid simulation and program analysis, saving significant costs and time. Quality assurance for software may be improved by the present method, as embodiments may be used to accurately determine what inputs are needed to fully test an application. This can also decrease time to market by, for example, reducing the amount of inputs that need to be tested.

By finding phase behavior of programs, better code may be found, and debugging can be improved. Also, by providing a signature of an interval of execution, for example, the present method can identify this signature in the future, or identify when the execution is different.

Security benefits are possible, as analysis aided by the present method can identify when a program has been tampered with. This can occur, for example, by determining when a code is being executed differently, for example, when it may have been modified by a virus.

Just-in-time (JIT) systems are assisted, as efficient JIT systems can be built to guide when to spend time on optimizing code. By using a hardware-independent metric for the component such as the code executed, analysis may be performed in a very short amount of time, on the order of how long it takes to execute the program itself, using a very fast high level code profiler. Reoptimization of a program can be expedited by determining when to perform the reoptimization.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method of analyzing a computer program, the computer program including instructions of code, the method comprising:
a processor and a memory performing:
selecting a number of continuous instructions that are run in program execution order to define an interval of execution;
running the code of the computer program, wherein said running the code comprises running a plurality of continuous instructions of the code in program execution order, wherein within the plurality of continuous instructions, the code is run over a plurality of the defined intervals of execution, wherein each of the plurality of defined intervals of execution is run over the selected number of continuous instructions;
during said step of running the code, tracking a statistic for a program component;
identifying a behavior of the computer program over each of the plurality of defined intervals of execution over which the code is run based on the tracked statistic;
comparing at least one identified behavior for at least one defined interval of execution over which the code is run to another defined interval of execution over which the code is run to determine similarity between the defined intervals of execution.

2. The method of claim 1 wherein said step of running the code comprises at least one of executing the program on hardware, simulating the program's execution in software, direct execution, emulating the program's execution in software, and modeling a hypothetical execution in software.

3. The method of claim 2 wherein the statistic comprises at least one of a hardware metric and a hardware-independent metric.

4. The method of claim 3 wherein the statistic comprises at least one of frequency of the component occurring in execution, number of instructions executed, amount of memory used by the program component, time, IPC, performance counters, program counters, and cache miss rate.

5. The method of claim 2 wherein the program component comprises an identifiable section of control flow of the computer program.

6. The method of claim 5 wherein the program component comprises at least one of an instruction, basic block, procedure, loop, load instruction, and branch instruction.

7. The method of claim 5 wherein the program component comprises a basic block, the basic block being a section of the code having a single entry point and a single exit.

8. The method of claim 2 wherein the program component comprises a memory region.

9. The method of claim 2 wherein each of the plurality of intervals of execution is selected independently of particular lines of code of the computer program.

10. The method of claim 2 further comprising:
based on said comparing step, classifying the plurality of defined intervals of execution over which the code is run into at least one cluster, said one or more clusters being based on similarity of behavior.

11. The method of claim 10 further comprising:
selecting at least one representative interval of execution for each of the at least one cluster.

12. The method of claim 11 wherein each of the at least one representative interval of execution is closest to an average behavior of the cluster.

13. The method of claim 12 further comprising:
weighing each of the selected representative intervals of execution based on at least one of a total amount of time, a number of instructions within the cluster, the program component, and the statistic;
wherein the weighted representative intervals collectively represent a complete execution of at least a subset of the computer program;
and further comprising minimizing the number of clusters.

14. The method of claim 11 wherein the representative interval of execution is the earliest interval of execution within a predetermined distance from an average behavior of the cluster.

15. The method of claim 14 further comprising:
weighing each of the selected representative intervals of execution based on at least one of a total amount of time, a number of instructions within the cluster, the program component, and the statistic;
wherein the weighted representative intervals collectively represent a complete execution of at least a subset of the computer program; and further comprising
minimizing the number of clusters.

16. The method of claim 15 wherein the step of comparing comprises:
comparing each defined interval over which the code is run to the intervals of execution representing at least a subset of execution of the computer program.

17. The method of claim 16 further comprising:
based on said comparing step, identifying an end of an initialization of the computer program.

18. The method of claim 16 further comprising:
based on said comparing step, identifying a length of at least one repeating interval of execution.

19. The method of claim 18 wherein said step of identifying a length comprises performing an analysis of a signal, the signal comprising differences between each identified interval of execution and the interval of execution representing the at least a subset of execution of the computer program.

20. The method of claim 11 further comprising:
weighing each of the selected representative intervals of execution based on at least one of a total amount of time, a number of instructions within the cluster, the program component, and the statistic.

21. The method of claim 20 wherein the weighted representative intervals collectively represent a complete execution of at least a subset of the computer program.

22. The method of claim 21 further comprising:
minimizing the number of clusters.

23. The method of claim 10 further comprising:
minimizing the number of clusters.

24. The method of claim 10 further comprising:
determining a confidence and variance by sampling the defined intervals of execution over which the code is run within a particular cluster for at least one of a hardware metric and a hardware-independent metric.

25. The method of claim 1 wherein the defined intervals of execution comprise at least one of overlapping and non-overlapping intervals;
wherein each of the defined intervals of execution comprises a plural number of continuous instructions in program execution order.

26. The method of claim 2 wherein the behavior identified for a particular one of the defined plurality of intervals of execution over which the code is run is collected in a vector, the vector containing the statistic for at least one element representing at least one component.

27. The method of claim 26 wherein the vector is retained in at least one of the memory, a storage medium, and a table.

28. The method of claim 27 wherein the vector is stored as a signature that represents at least one of the behavior of a complete vector, a projection of the vector, a compressed representation of the vector, a partial representation of the vector, and a subset of the identified behavior collected in the vector.

29. The method of claim 28 further comprising:
storing a phase ID with the signature, wherein the phase ID comprises at least one of a complete signature, a subset of the signature, a partial representation of the signature, a name independent of the signature, and a number.

30. The method of claim 29 wherein the stored phase ID is identified for an interval by looking up the signature in storage and based on said looking up, either using the phase ID stored with the signature or creating a new phase ID.

31. The method of claim 30 wherein the identified behavior and the tracked statistic for at least one interval with a phase ID are stored and associated with one another.

32. The method of claim 31 wherein, if a storage area for storing the phase ID, behavior, and statistic is finite, only a single stored signature for a phase ID, and the phase ID, are stored.

33. The method of claim 30 further comprising, after the phase ID is identified by a signature for an interval:
looking up the phase ID to find the associated statistic for the interval.

34. The method of claim 33 further comprising:
using the found associated statistic, performing at least one of a behavior optimization, statistic optimization, load-time optimization, run-time optimization, and hardware reconfiguration.

35. The method of claim 30 wherein the phase ID is stored in a prediction table, and further comprising:
predicting a phase ID for an interval using the stored phase ID.

36. The method of claim 35 further comprising:
retrieving information for the predicted phase ID;
using the retrieved information, guiding optimization for the computer program.

37. A method of analyzing a computer program, the computer program including instructions of code, the method comprising:
a processor and a memory performing;
selecting a number of continuous instructions that are run in program execution order to define an interval of execution;
running the code of the computer program, wherein said running the code comprises running a plurality of continuous instructions of the code in program execution order, wherein within the plurality of continuous instructions, the code is run over a plurality of the defined intervals of execution, wherein each of the plurality of defined intervals of execution is run over the selected number of continuous instructions;

during said step of running the code, tracking a statistic for a program component;

identifying a behavior of the computer program over each of the plurality of defined intervals of execution over which the code is run based on the tracked statistic;

classifying each of the at least one intervals of execution over which the code is run according to the identified behavior into clusters of similar behavior.

38. The method of claim 37 wherein said step of identifying comprises identifying a frequency of execution of basic blocks of the executed code, wherein each of the at least one basic block comprises a piece of code of the computer program executed from start to finish, said basic block having only one entry point and one exit.

39. The method of claim 38 wherein said step of identifying a frequency provides a group of frequencies for each of the number of defined intervals of execution over which the code is run.

40. The method of claim 39 wherein said step of classifying further comprises:
comparing the identified behavior of one of the defined intervals of execution over which the code is run to the identified behavior of another of the defined intervals of execution over which the code is run to identify a phase.

41. The method of claim 40 further comprising:
identifying an initialization phase;
determining at least one analysis point occurring after execution of the identified initialization phase.

42. The method of claim 38 wherein said step of identifying a frequency of execution for each of the at least one basic block comprises:
for each of the number of defined intervals over which the code is run, determining a interval vector, the interval vector comprising a plurality of ordered elements, each of the plurality of ordered elements relating to a particular basic block and representing a frequency of execution of the particular basic block.

43. The method of claim 38 further comprising:
partitioning the computer program into a set of clusters by comparing the determined interval vectors to one another.

44. The method of claim 43 wherein said step of partitioning further comprises:
determining a group of clusters;
comparing each of the interval vectors to each of the set of clusters;
adding the compared interval vector to a particular cluster based on a goodness of fit between the compared basic block vectors and each of the group of clusters;
changing a centroid of each of the group of clusters;
repeating the comparing, adding, and clustering steps to form the set of clusters.

45. A method of analyzing a computer program, the computer program including instructions of code, the method comprising:
a processor and a memory performing;
selecting a number of continuous instructions that are run in program execution order to define an interval of execution;
running the code, wherein said running the code comprises running a plurality of continuous instructions of the code in program execution order, wherein within the plurality of continuous instructions, the code is run over a plurality of the defined intervals of execution, wherein each of the plurality of defined intervals of execution is run over the selected number of continuous instructions;

during said step of running the code, tracking a statistic for a program component;

identifying a behavior of a hardware-independent metric over each of the plurality of defined intervals of execution over which the code is run based on the tracked statistic;

identifying behavior of the hardware-independent metric over full execution of the code to identify a target behavior;

comparing the identified behavior of each of the plurality of defined intervals of execution over which the code is run to the identified target behavior over full execution of the code to determine a representative interval;

simulating execution of the computer program over the determined representative interval.

46. The method of claim 45 wherein said step of identifying comprises:
deriving a plurality of basic block vectors, each basic block vector representing code blocks of the program executed during the defined interval of execution over which the code is run, the basic block vector being based on frequencies of basic blocks of executed code within execution of the program;
wherein the basic block vector comprises a single dimensional array where a single element in the array exists for a basic block in the program.

47. The method of claim 45 wherein the method is performed in run-time.

48. The method of claim 47 wherein said step of identifying comprises tracking a proportion of instructions executed from different sections of code of the program over which each of the defined plurality of intervals is run;
further comprising, for each of the defined plurality of intervals over which the code is run, classifying the identified behavior into phases corresponding to changes in behavior across the executed code.

49. The method of claim 48 further comprising:
predicting when execution of the code is about to enter a phase change;
predicting a phase entered by the phase change.

50. The method of claim 48 wherein said step of identifying comprises, for each section of code:
capturing an identifier of the section of code;
capturing a number of instructions executed for the section of code.

51. The method of claim 50 further comprising:
reducing a number of the identified sections of code to a lower number.

52. The method of claim 50 further comprising:
comparing each section of code to a section of code in a history;
if the compared section of code varies from the section of code in the history by a greater amount than a predetermined threshold, adding the compared section of code to the history.

53. A method of analyzing a computer program, the computer program including instructions of code, the method comprising:
a processor and a memory performing;
selecting an amount of execution time over which continuous instructions of the code are run in program execution order to define an interval of execution;
running the code of the computer program, wherein said running the code comprises running a plurality of continuous instructions of the code in program execution order, wherein within the plurality of continuous instructions, the code is run over a plurality of the defined intervals of execution, wherein each of the plurality of defined intervals of execution is run over the selected amount of execution time;

during said step of running code, tracking a statistic for a program component;

identifying a behavior of the computer program over each of the defined plurality of intervals of execution over which the code is run based on the tracked statistic;

comparing at least one identified behavior for at least one defined interval of execution over which the code is run to another defined interval of execution over which the code is run to determine similarity between the intervals of execution.

* * * * *

UNITED STATES PATENT AND TRADEMARK OFFICE
CERTIFICATE OF CORRECTION

| | | |
|---|---|---|
| PATENT NO. | : 7,802,236 B2 | Page 1 of 1 |
| APPLICATION NO. | : 10/659066 | |
| DATED | : September 21, 2010 | |
| INVENTOR(S) | : Brad Calder et al. | |

It is certified that error appears in the above-identified patent and that said Letters Patent is hereby corrected as shown below:

On the Patent Face:  Insert

Item -- [60] Related Application Data

Provisional applications No. 60/409,105 filed on September 9, 2002 and
No. 60/409,106 filed on September 9, 2002. --

In the Specification;
Col. 1, Line 4

Before "Statement of Government Interest"
Insert
-- PRIORITY CLAIM

Applicants claim the benefit of U.S. provisional patent applications No. 60/409,105 filed on September 9, 2002 and No. 60/409,106 filed on September 9, 2002 under 35 U.S.C. §119. --

Signed and Sealed this
Second Day of August, 2011

David J. Kappos
*Director of the United States Patent and Trademark Office*